United States Patent
Ashihara et al.

(10) Patent No.: US 12,479,195 B2
(45) Date of Patent: Nov. 25, 2025

(54) GAS BARRIER LAMINATE AND METHOD FOR MANUFACTURING SAME

(71) Applicant: UNITIKA LTD., Osaka (JP)

(72) Inventors: Hiroshi Ashihara, Uji (JP); Goro Araki, Uji (JP); Atsushi Maehara, Uji (JP)

(73) Assignee: UNITIKA LTD., Osaka (JP)

( * ) Notice: Subject to any disclaimer, the term of this patent is extended or adjusted under 35 U.S.C. 154(b) by 0 days.

(21) Appl. No.: 18/726,197

(22) PCT Filed: Mar. 25, 2023

(86) PCT No.: PCT/JP2023/012060
§ 371 (c)(1),
(2) Date: Jul. 2, 2024

(87) PCT Pub. No.: WO2023/190269
PCT Pub. Date: Oct. 5, 2023

(65) Prior Publication Data
US 2025/0108589 A1     Apr. 3, 2025

(30) Foreign Application Priority Data

| Mar. 29, 2022 | (JP) | 2022-053747 |
| Aug. 27, 2022 | (JP) | 2022-135453 |
| Feb. 9, 2023 | (JP) | 2023-018289 |

(51) Int. Cl.
B32B 27/20   (2006.01)
B32B 27/34   (2006.01)
B32B 27/36   (2006.01)

(52) U.S. Cl.
CPC .............. *B32B 27/20* (2013.01); *B32B 27/34* (2013.01); *B32B 27/36* (2013.01);
(Continued)

(58) Field of Classification Search
CPC ........ B32B 27/20; B32B 27/306; B32B 27/34
See application file for complete search history.

(56) References Cited

U.S. PATENT DOCUMENTS

2015/0251389 A1*   9/2015   Maehara .................. C08J 7/048
                                                                    428/480

FOREIGN PATENT DOCUMENTS

| EP | 2896501 A1 | 7/2015 |
| JP | 2007-276421 A | 10/2007 |

(Continued)

*Primary Examiner* — Zachary M Davis
(74) *Attorney, Agent, or Firm* — Troutman Pepper Locke LLP

(57) ABSTRACT

A gas barrier laminate with a total thickness of 100 μm or less, including a plastic base material (I) and a gas barrier layer (II) laminated on said plastic base material, wherein (1) plastic base material (I) includes a metal-containing layer including at least one metal and a metal compound and a resin component, (2) the total content of metal and metal compound in said metal-containing layer is 0.1 to 70% by mass, (3) gas barrier layer (II) contains polycarboxylic acid, (4) metal-containing layer and gas barrier layer are laminated so that they are in direct contact with each other, and (5) gas barrier laminate is treated at a temperature of 95° C. for 30 minutes. (5) the gas barrier laminate has an oxygen transmission rate of 300 ml/(m²·day·MPa) or less under a temperature of 40° C. and a humidity of 90% RH after hot water treatment for 30 minutes at 95° C.

12 Claims, 1 Drawing Sheet

(52) U.S. Cl.
CPC ............... *B32B 2307/7244* (2013.01); *B32B 2307/7376* (2023.05); *B32B 2367/00* (2013.01); *B32B 2377/00* (2013.01); *B32B 2553/00* (2013.01)

(56) References Cited

FOREIGN PATENT DOCUMENTS

| | | | |
|---|---|---|---|
| JP | 2017-185652 A | 10/2017 | |
| JP | 2018-58280 A | 4/2018 | |
| JP | 2019-151025 A | 9/2019 | |
| WO | 2014/042133 A1 | 3/2014 | |

* cited by examiner

GAS BARRIER LAMINATE AND METHOD FOR MANUFACTURING SAME

TECHNICAL FIELD

The present invention relates to a gas barrier laminate and a method for producing the same. In particular, the present invention relates to a gas barrier laminate having excellent gas barrier properties even under high temperature and high humidity.

BACKGROUND OF THE INVENTION

Plastic films such as polyamide films are used in a wide range of applications as packaging materials because of their superior strength, transparency, and formability. However, these plastic films are highly permeable to oxygen and other gases. Therefore, when the films are used as packaging for general foods, retort-pretreated foods, cosmetics, medical supplies, agricultural chemicals, etc., the oxygen and other gases that permeate the film may cause deterioration to the contents during long-term storage.

Accordingly, plastic films used for these packaging applications must have gas barrier properties, and in the packaging of foods and other products containing water, gas barrier properties under high humidity are also required.

In response to this, a method of laminating a gas barrier layer on a film has been proposed as a method of imparting gas barrier properties to plastic films. Specifically, it is known to use a gas barrier layer consisting of a polycarboxylic acid polymer, a polyalcohol polymer, and a metal compound.

For example, in Patent Literatures 1-3, a gas barrier laminate in which a gas barrier layer (II) containing a polycarboxylic acid is laminated onto a plastic base material (I) containing a metal compound is disclosed as a method for producing a gas barrier laminate having gas barrier properties even under high humidity conditions.

PRIOR ART REFERENCES

Patent Literature

Patent Literature 1: Patent Application Publication No. 2007-276421
Patent Literature 2: International Publication No. WO2014/042133
Patent Literature 3: Patent Application Publication No. 2019-151025

SUMMARY OF THE INVENTION

Problem to be Solved by the Invention

However, although the gas barrier laminates disclosed in Patent Literatures 1-3 have good gas barrier performance in environments similar to room temperature (e.g., 20° C. and 60% RH, 20° C. and 90% RH, 30° C. and 80% RH, etc.), there is still room for improvement in gas barrier performance under high temperature and high humidity environments such as 40° C. and 90% RH, for example. In recent years, with global warming advancing, the surrounding environment during cargo transport in summer is extremely hot and humid. From the viewpoint of inhibiting oxidative deterioration of the contents in packaging bags, materials that can exhibit excellent gas barrier properties even under high temperature and high humidity environments are eagerly awaited, and in particular, the development of gas barrier properties at high temperatures above 40° C. is becoming increasingly important.

In general, in order to increase gas barrier performance in high temperature and high humidity environments, thicker films can generally be employed, but there is a need to develop thinner films especially from the viewpoints of bag-making processability and weight reduction of film products, as well as from the viewpoint of reducing the volume of raw materials in recent environmental issues.

Thus, there is a great need for the development of materials that can demonstrate high gas barrier performance under high temperature and high humidity environments, even though they are thinner films (especially films having a total thickness of 100 μm or less), but such materials has not yet been developed.

Therefore, a main object of the present invention is to provide a gas barrier laminate that can demonstrate excellent gas barrier properties even under high temperature and high humidity environments, even though it is a thinner film.

The inventor, after conducting diligent research in view of the problems of the conventional technology, discovered that a film obtained by a specific manufacturing method has a unique structure and thus produces a laminate that exhibits excellent gas barrier properties.

That is, the present invention is directed to the following gas barrier laminate and its manufacturing method.

1. A gas barrier laminate including a plastic base material (I) and a gas barrier layer (II) laminated on said plastic base material, and having a total thickness of 100 μm or less, wherein
    (1) the plastic base material (I) includes a metal-including layer containing a resin component and at least one selected from the group consisting of metal and a metal compound,
    (2) the total content of metal and metal compound in the metal-containing layer is 0.1 to 70% by mass,
    (3) the gas barrier layer (II) contains a polycarboxylic acid,
    (4) the metal-containing layer and gas barrier layer are laminated so that the layers are in direct contact with each other, and
    (5) the gas barrier laminate has an oxygen transmission rate of 300 ml/($m^2$·day·MPa) or less under a temperature of 40° C. and a humidity of 90% RH after hot water treatment at 95° C. for 30 minutes.

2. The gas barrier laminate according to the claim 1, wherein the plastic base material (I) comprises a multi-layer film.

3. The gas barrier laminate according to the claim 1, wherein the metal-containing layer contains a polyamide resin or polyester resin as a resin component.

4. The gas barrier laminate according to the claim 1, wherein the gas barrier layer (II) contains a polyalcohol.

5. The gas barrier laminate according to the claim 1, wherein at least one selected from the group consisting of magnesium, calcium, and zinc is contained as the metal or metal compound.

6. A method for manufacturing a gas barrier laminate, wherein the method comprises steps of
    (1) preparing a coating liquid for forming a gas barrier layer by passing a raw material liquid containing a polycarboxylic acid through a filter having a filtration accuracy of 1.0 to 10.0 μm; and
    (2) applying the coating liquid to at least a surface of a metal-containing layer of a plastic base material (I)

including the metal-containing layer containing a resin component and at least one of a metal or metal compound.

7. The method for manufacturing a gas barrier laminate according to the claim 6, wherein the coating liquid for forming the gas barrier layer contains a defoaming agent having an average particle diameter of 0.1 to 5.0 μm.

8. The method for manufacturing a gas barrier laminate according to the claim 6, wherein the raw material liquid contains an antifoaming agent.

9. The method for manufacturing a gas barrier laminate according to the claim 6, further comprising a step of subjecting the laminate coated with the coating liquid for forming the gas barrier layer to simultaneous biaxial stretching or sequential biaxial stretching.

10. A packaging bag including the gas barrier laminate according to any one of claims 1 to 5.

Advantages of the Present Invention

According to the present invention, the present invention can provide a gas barrier laminate that can demonstrate excellent gas barrier properties even in high temperature and high humidity environments, while being a thinner film. In particular, since the gas barrier layer of the gas barrier laminate of the present invention is formed by a coating liquid that has undergone a specific filtration process, it can demonstrate high gas barrier performance even under the harsh conditions of high temperature and high humidity, especially even if the total thickness is 100 μm or less.

The reason why a relatively thin laminate with a total thickness of 100 μm or less (or even 50 μm or less) can demonstrate high gas barrier performance as described above is not clear, but it may be because a specific filtration process removes unnecessary fine solids from the coating liquid and also makes the coating liquid more homogeneous. This is presumably due to the fact that the specific filtration process removes unnecessary fine solids from the coating liquid and also makes the coating liquid more homogeneous, resulting in the formation of a thinner but more homogeneous coating film with fewer defects that can cause gas leakage. Thus, because of its excellent gas barrier properties under high temperature and high humidity, it is possible to inhibit deterioration such as oxidation and corrosion of the contents without being affected by the season, storage environment, or transportation environment, for example.

Thus, the gas barrier laminate of the present invention is composed of thin materials with a total thickness of 100 μm or less, and thus, in addition to demonstrating excellent bag-making processability (thermal adhesion, etc.) when making bags, it can also contribute to weight reduction of products, volume reduction of materials, and reduction of production costs, or the like.

In addition, the gas barrier laminate of the present invention has significant industrial advantages in terms of productivity and cost, since the plastic base material containing the metal-containing layer can be produced simply by adding a metal or metal compound to the raw material of the plastic base material.

EMBODIMENT OF THE PRESENT INVENTION

1. Gas Barrier Laminate

The gas barrier laminate of the present invention is a gas barrier laminate including a plastic base material (I) and a gas barrier layer (II) laminated on the plastic base material, and having a total thickness of 100 μm or less, wherein
(1) the plastic base material (I) includes a metal-containing layer containing a resin component and at least one selected from the group consisting of a metal and metal compound,
(2) the total content of the metal and metal compound in the metal-containing layer is 0.1 to 70% by mass,
(3) the gas barrier layer (II) contains polycarboxylic acid,
(4) the metal-containing layer and gas barrier layer are laminated so that the layers are in direct contact with each other, and
(5) the gas barrier laminate has an oxygen transmission rate of 300 ml/(m$^2$·day·MPa) or less under an environment of temperature of 40° C. and humidity of 90% RH after hot water treatment at 95° C. for 30 minutes.

Figure 1:
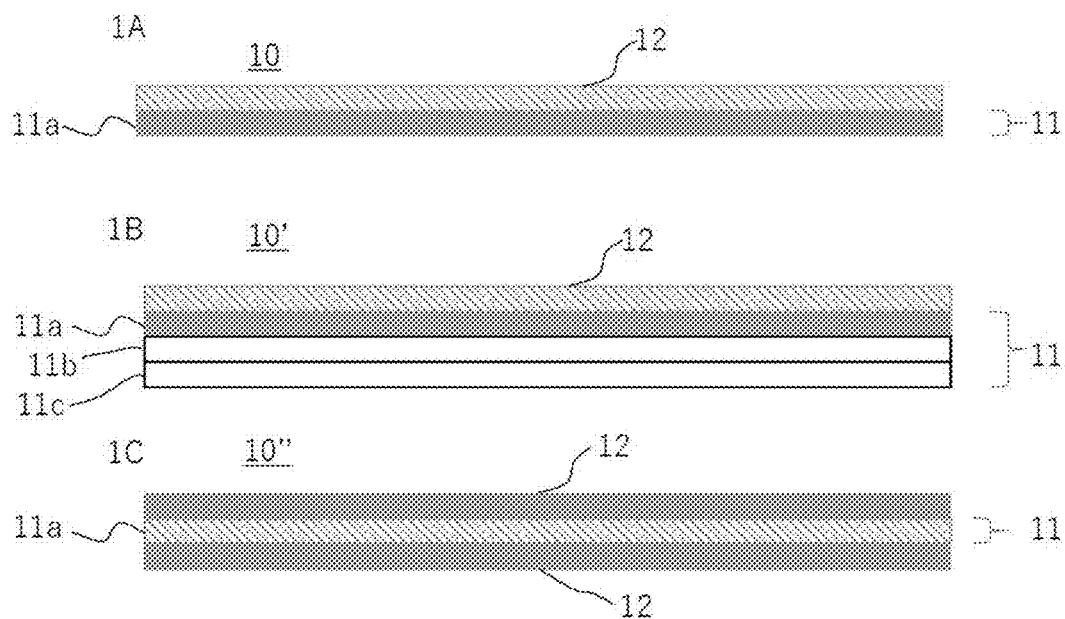
FIG. 1 shows an example of a layer configuration of a gas barrier laminate of the present invention.

FIG. 1 shows an example of the layer structure of the laminate of the present invention. In the laminate 10 of FIG. 1A, the plastic base material 11 is composed of a single layer including a metal or metal compound (hereinafter, unless otherwise specified, both are collectively referred to as the "metal component"), and a gas barrier layer 12 is laminated on the surface of the metal-containing layer 11a. Thus, the direct contact between the metal-containing layer 11a and the gas barrier layer 12 allows the metal component contained in the metal-containing layer 11a to react with the polycarboxylic acid contained in the gas barrier layer 12, thereby providing superior gas barrier properties.

In the laminate 10' of FIG. 1B, the plastic base material 11 consists of multiple layers composed of a metal-containing layer 11a that contains a resin component and a metal component and resin-containing layers 11b, 11c that do not contain a metal component (hereinafter also referred to as "other resin-containing layer"). A gas barrier layer 12 is laminated on the surface of the metal-containing layer 11a. Also in this case, the direct contact between the metal-containing layer 11a and the gas barrier layer 12 allows the metal component contained in the metal-containing layer 11a to react with the polycarboxylic acid contained in the gas barrier layer 12, thereby providing more excellent gas barrier properties. The other resin layer can be composed of one layer or more layers, although FIG. 1A shows two layers.

In the laminate 10" of FIG. 1C, the plastic base material 11 consists of a single layer of metal-containing layer IIa containing a metal component, and a gas barrier layer 12 is laminated on the surface of both sides of the metal-containing layer 11a, respectively. Also in this case, because the metal-containing layer 11a directly contacts the gas barrier layer 12, the metal component contained in the metal-containing layer 11a can react with the polycarboxylic acid contained in the gas barrier layer 12. As a result, the laminate can exhibit even better gas barrier properties.

Figure 2:
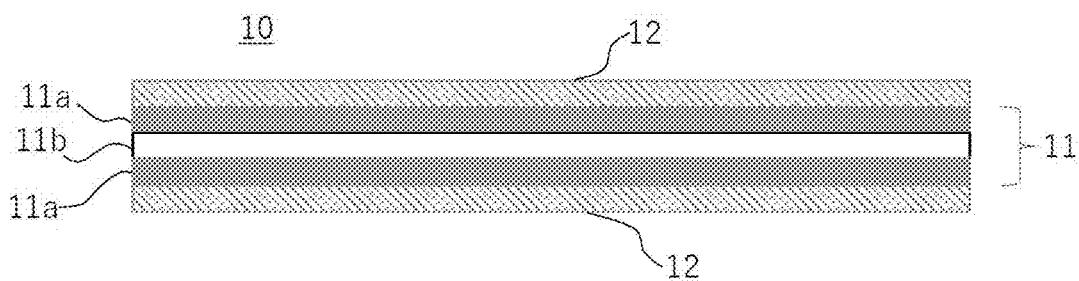
FIG. 2: Another example of the layer configuration of the gas barrier laminate of the present invention.

In FIG. 1, in the above cases, only one metal-containing layer is formed, but two or more metal-containing layers can be formed. As shown in FIG. 2, the plastic base material 11 is composed of multiple layers in which metal-containing layers 11a are formed on both sides of other resin-containing layer 11b, and a gas barrier layer 12 is laminated on the surface of each metal-containing layer 11a, respectively. In other words, a layer configuration in which two metal-containing layers sandwich other resin-containing layer 11b is also included in the present invention. Thus, a gas barrier layer (II) is laminated on at least one side of the plastic substrate (I), while a gas barrier layer (II) or other barrier layer may also be formed on the opposite side. The double-sided coating makes it possible to further enhance the gas barrier properties in high temperature and high humidity environments. Laminates having three or more metal-containing layers on one or both sides of the plastic base material are also encompassed in the present invention.

(1) Each Layer of the Laminate

Plastic Base Material

The plastic base material functions as a support member of the laminate, and functions as a source that supplies the metal component to the gas barrier layer.

The plastic base material includes a metal-containing layer (a layer containing a metal element) that contains a resin component and at least one metal or metal compound. Therefore, the plastic base material may be a single layer consisting of a single metal-containing layer or a multiple layer containing a metal-containing layer and a layer other than the metal-containing layer. The metal-containing layer may be two or more layers.

Metals (metal itself) include, but not limited to, monovalent metals such as lithium, sodium, potassium, rubidium, cesium, or the like, and divalent or higher metals such as magnesium, calcium, zirconium, zinc, copper, cobalt, iron, nickel, aluminum, or the like. These metals are preferred in terms of gas barrier properties. Among them, metals with high ionization tendency are preferred from the viewpoint of easy reaction with carboxylic acids. Specifically, at least one metal of lithium, sodium, potassium, magnesium, calcium, or zinc is preferred, and especially at least one metal selected from the group consisting of magnesium, calcium, and zinc is more preferred.

Although the metals constituting the metal compound are not particularly limited, but monovalent metals such as lithium, sodium, potassium, rubidium, cesium, or the like, and divalent or higher metals such as magnesium, calcium, zirconium, zinc, copper, cobalt, iron, nickel, aluminum, or the like are preferred in terms of gas barrier properties. Among them, metals with high ionization tendency are preferred from the viewpoint of easy reaction with carboxylic acids. Specifically, at least one metal selected from the group consisting of lithium, sodium, potassium, magnesium, calcium, and zinc is preferred, especially at least one metal selected from the group consisting of magnesium, calcium, and zinc. The type of metal is not limited to one type, but can be two or more.

The metal compound can be any compound containing the above metals, for example, inorganic salts such as oxides, hydroxides, halides, carbonates, bicarbonates, phosphates, and sulfates, or the like, organic acid salts such as carboxylic salts like acetates, formates, stearates, citrates, malates, maleates, or the like, and sulfonates.

As the above metal compounds, for example, at least one selected from the group consisting of lithium carbonate, sodium bicarbonate, magnesium oxide, magnesium carbonate, magnesium hydroxide, magnesium acetate, calcium oxide, calcium carbonate, calcium hydroxide, calcium chloride, calcium phosphate, calcium sulfate, calcium acetate, zinc acetate, zinc oxide, zinc carbonate, or the like can be suitably used. In the present invention, at least one type selected from the group consisting of oxide, hydroxide, carbonate, bicarbonate, acetate, etc. is particularly preferred. In particular, divalent metal compounds such as magnesium salt exemplified by magnesium oxide, magnesium carbonate, magnesium hydroxide, magnesium acetate, and the like; calcium salts exemplified by calcium carbonate, calcium acetate, and the like; zinc salts exemplified by zinc oxide, zinc acetate, and the like are preferred in terms of gas barrier properties. In terms of ensuring the transparency of the plastic base material (I), monovalent metal compounds such as lithium carbonate, sodium bicarbonate, and magnesium compounds such as magnesium oxide, magnesium carbonate, and magnesium hydroxide, or the like are especially preferred. These can be used singly or in combination of two or more types. Of these, at least one type of oxide or carbonate is particularly preferred.

The form of the metal component is not limited, but it is usually preferred to be in powder form, and its average particle diameter is not particularly limited, but is usually in the range of about 0.001 to about 10.0 µm, especially 0.005 to 5.0 µm is more preferred, and even 0.01 to 2.0 µm is more The most preferable of these is 0.05 to 1.0 µm. In terms of being able to improve the transparency of the plastic base material (I), the smaller the average particle diameter of the metal component, the more desirable it is. On the other hand, metal components having an average particle diameter of less than 0.001 µm tend to aggregate due to their large surface area, and coarse aggregates may be scattered in the film, which may degrade the mechanical properties of the base material. In contrast, plastic base material (I) containing metal components having an average particle diameter exceeding 10.0 µm tends to break more frequently when forming films, resulting in lower productivity. In addition, if the average particle diameter exceeds 10.0 µm, the plastic base material (I) may become unsuitable for thin thickness.

Dispersibility, weather resistance, wettability with thermoplastic resin, heat resistance, transparency, or the like can be improved or enhanced by surface treatment of the metal component particles, such as inorganic or organic treatment. Inorganic treatments include, for example, alumina treatment, silica treatment, titania treatment, zirconia treatment, tin oxide treatment, antimony oxide treatment, zinc oxide treatment, or the like. Organic treatments include, for example, treatments using fatty acid compounds, polyol compounds such as pentaerythritol and trimethylolpropane, amine compounds such as triethanolamine and trimethylolamine, and silicone compounds such as silicone resin and alkylchlorosilane, or the like. One or more of these compounds can be employed.

The content of metal components (total content of metal and metal compounds) in the metal-containing layer is usually 0.1 to 70 mass %, especially 0.1 to 50 mass %, and even more preferably 0.2 to 20 mass %, of which 0.2 to 5 mass % is most preferably. From the viewpoint of haze (transparency), it is preferable that the content be less than 5 mass %. Excellent gas barrier properties can be obtained by setting the content of the metal component in the metal-containing layer to 0.1 to 70 mass %. If the content of the metal component in the metal-containing layer is less than 0.1 mass %, the crosslinked structure formed by reaction with the polycarboxylic acid in the gas barrier layer (II) is reduced, the resulting gas barrier laminate thereby has lower gas barrier property. On the other hand, a metal-containing layer with a metal component content exceeding 70 mass % tends to break more frequently due to stretching during film formation, resulting in lower productivity and lower mechanical properties.

The method of including metal components in the metal-containing layer is not particularly limited, and the metal components can be blended at any point in the manufacturing process. Examples of the method include a method in which the metal component is added during polymerization for the thermoplastic resin that constitutes the metal-containing layer, a method in which the metal component is kneaded with the thermoplastic resin using an extruder, or a method in which a master batch is prepared by kneading the metal component at a high concentration into a thermoplastic resin, and the master batch is diluted by adding it to a thermoplastic resin (master batch method). In the present invention, the master batch method is preferably employed from the viewpoint of work efficiency.

In the present invention, one or more types of thermoplastic resin can usually be used as the resin component constituting the metal-containing layer, although there is no particular limitation. Thermoplastic resins include, for example, at least one selected from the group consisting of polyolefin resins such as polyethylene, polypropylene, ionomer, etc.; polyamide resins such as nylon 6, nylon 66, nylon 46, nylon MXD6, nylon 9T, etc.; polyester resins such as polyethylene terephthalate, polyethylene isophthalate, polyethylene naphthalate, polytrimethylene terephthalate, polytrimethylene naphthalate, polybutylene terephthalate, polybutylene naphthalate, polylactic acid, etc.; polyvinyl chloride, polystyrene resin, polycarbonate resin, polyarylate resin, ethylene-vinyl acetate copolymer, ethylene-vinyl alcohol copolymer, or the like. Among these thermoplastic resins, at least one type of polyamide resin or polyester resin is preferred. In particular, polyamide resin (especially Nylon 6) is more preferred in terms of its superior puncture strength, impact resistance, and the like when used to make packaging bags. On the other hand, Polyester resins (especially polyethylene terephthalate) are also more preferred in terms of superior heat resistance and economic efficiency. Therefore, these resin components can be selected according to the application of the laminate, or the like.

The thermoplastic resin constituting the metal-containing layer may contain any one or more of biomass-derived components, chemically recycled resin components polymerized from recycled monomers or oligomers obtained by depolymerizing resin waste or the like, material recycled resin components obtained by melting edge-trimmed waste, slit waste, film waste or defective film again and pelletizing it.

The content of the resin component in the metal-containing layer may normally be the remainder excluding the metal component and additives added as necessary. Thus, for example, it can be set to 99.9 to 30 mass %, 99.9 to 50 mass %, 99.8 to 80 mass %, or even 99.8 to 95 mass %.

The metal-containing layer may contain at least one of various additives such as heat stabilizers, antioxidants, reinforcing materials, pigments, anti-degradation agents, weather resistant agents, flame retardants, plasticizers, preservatives, UV absorbers, antistatic agents, antiblocking agents, or the like as needed, as long as they do not adversely affect the advantages of the present invention. Inorganic or organic lubricants other than metal components may be added to the metal-containing layer for the purpose of imparting the slipperiness to the plastic base material (I), etc. Among them, silica is especially preferred.

The total content of these additives may normally be about 5 mass % or less in the metal-containing layer, but is not limited to this. If these additives also fall under "at least one metal and one metal compound" in the metal-containing layer, the content of the additives shall be included as the content of said "at least one metal and one metal compound".

The thickness of the metal-containing layer is not limited, but from the viewpoint of thickness control, reactivity with the gas barrier layer, etc., the thickness can usually be set appropriately within the range of about 5 to about 95 μm, but especially 10 to 30 μm is preferred. Thus, for example, it can be set to 12 to 25 μm.

The plastic base material (I) may comprise a single layer of metal-containing layers as described above, or may comprise multiple layers of a metal-containing layer and one or more layers of other resin-containing layers.

In this case, the other resin-containing layer can be any layer containing thermoplastic resin. The thermoplastic resin includes at least one of the aforementioned thermoplastic resins that can be employed in the metal-containing layer. In this case, the thermoplastic resin contained in the metal-containing layer and the thermoplastic resin contained in the other resin-containing layer may be the same or different from each other.

The other resin-containing layer may also contain at least one of the aforementioned additives that can be employed in the metal-containing layer in a range that does not substantially adversely affect the advantages of the present invention. In this case, the total content of the additives may normally be about 5 mass % or less in the other resin-containing layer (or each layer if there is one or more of other resin-containing layers), but is not limited to this. The other resin-containing layer can be either a layer containing a metal component or layer that does not contain a metal component, but a layer that does not contain a metal component may be particularly suitable. The content of the resin component in the other resin-containing layer may usually be the remainder other than the additive agent mentioned above. Thus, for example, it can be set to about 95 to about 100 mass %, but is not limited to this.

As for the structure of the plastic base material (I), as described above, it may consist of only the metal-containing layer, or it may be a multi-layer including other resin-containing layer(s) together with the metal-containing layer. In other words, the plastic base material in the present laminate can be either (a) composed of one or more metal-containing layers, or (b) composed of one or more metal-containing layers and one or more other resin-containing layers.

The thickness ratio of the metal-containing layer (M) and the other resin-containing layer (R) in the case of the above (b) is not particularly limited, and the ratio [(Rt)/(Mt)] of the total thickness (Mt) of the metal-containing layer (M) and the total thickness (Rt) of the other resin-containing layer (R) is preferably 1/1000 to 1000/1, and 1/100 to 100/1 is more preferable, and further 1/10 to 10/1 is even more preferable, since the thickness of each layer is easy to control. The other resin-containing layer (R) may be referred to simply as the "resin layer (R)" in the following.

The thickness of the plastic base material (I) can be set according to the mechanical strength required for the resulting gas barrier laminate. In particular, for reasons of mechanical strength and ease of handling, the thickness of the plastic base material (I) can be set appropriately within a range of generally about 5 to about 99.95 μm, in particular, 5 to 50 μm is preferred, furthermore, 5 to 40 μm is more preferred, among which 10 to 30 μm is most preferred. If the thickness of the plastic base material (I) is less than 5 μm, sufficient mechanical strength cannot be obtained and the piercing strength tends to decrease.

Gas Barrier Layer (II)

The gas barrier layer (II) constituting the present laminate contains polycarboxylic acid. The polycarboxylic acid in the gas barrier layer (II) reacts with the metal component in the plastic base material (I) to produce the desired gas barrier properties.

The polycarboxylic acid can be any compound (including polymerized compounds) having two or more carboxyl groups in its molecule. These carboxyl groups may also form an anhydride structure.

Specific examples of polycarboxylic acids include 1,2,3,4-butane tetracarboxylic acid, polyacrylic acid, polymethacrylic acid, acrylic acid-methacrylic acid copolymer, acrylic acid-maleic acid copolymer, polymaleic acid, olefin-maleic acid copolymers such as ethylene-maleic acid copolymer, polysaccharides having carboxyl groups on the side chain such as alginic acid, polyamides containing carboxyl groups, and polyesters containing carboxyl groups. Each of the above polycarboxylic acids can be used singly or in combination of two or more.

When the polycarboxylic acid is a polymer, its weight-average molecular weight is not limited, but is usually from 1,000 to 1,000,000, and especially from 10,000 to 150,000, of which 15,000 to 110,000 is most preferred. If the weight-average molecular weight of the polycarboxylic acid is too low, the resulting gas barrier layer (II) will be brittle. On the other hand, if the weight-average molecular weight of the polycarboxylic acid is too high, handling may be impaired, and in some cases, aggregation occurs in a coating liquid for forming the gas barrier layer (II) as described below, the gas barrier properties of the resulting gas barrier layer (II) may be impaired.

In the present invention, it is preferred to use at least one polycarboxylic acids selected from the group consisting of polyacrylic acid, acrylic acid-maleic acid copolymer or olefin-maleic acid copolymer. Among them, olefin-maleic acid copolymers are preferable. In particular, ethylene-maleic acid copolymer (hereinafter referred to as "EMA") can be used suitably in terms of gas barrier properties.

EMA can be obtained, for example, by polymerizing maleic anhydride and ethylene with using a known method such as solution radical polymerization. Maleic acid units in olefin-maleic acid copolymers tend to be maleic anhydride structure with dehydration cyclization of adjacent carboxyl groups in a dry state, and the units become ring-opening maleic acid structure when wet or in aqueous solution. Therefore, in the present invention, maleic acid units and maleic anhydride units are collectively referred to as "maleic acid units" unless otherwise noted.

The amount of the maleic acid unit in EMA is not limited, but it is usually preferred to be 5 mol % or more, especially 20 mol % or more, and even more preferred to be 30 mol % or more, of which 35 mol % or more is most preferred. The upper limit of the amount is not particularly limited, but is usually 90 mol % or less, and especially 80 mol % or less. The weight-average molecular weight of EMA is not limited, but usually from about 1,000 to about 1,000,000 is preferred, especially from 3,000 to 500,000 is more preferable, especially from 7,000 to 300,000 is even more preferable, among them, 10,000 to 200,000 is the most preferred.

The content of the polycarboxylic acid in the gas barrier layer (II) may be 100 mass % or less (e.g. 50 to 80 mass %, also e.g. 60 to 75 mass %), but the gas barrier layer (II) may also contain other components. In the present invention, it is particularly preferred to contain polyalcohols. By including polyalcohol, the polycarboxylic acid in the gas barrier layer (II) reacts with the metal component in the plastic base material (I) and also with the polyalcohol, thereby enhancing the gas barrier property. Therefore, the gas barrier layer can contain, for example, about 20 to about 50 mass % of polyalcohol, and preferably 25 to 40 mass % of polyalcohol.

Polyalcohols are not limited to, for example, compounds having two or more hydroxyl groups in the molecule. These compounds can be either low molecular weight compounds or high molecular weight compounds.

The above low molecular weight compounds include, for example, sugar alcohols such as glycerin, pentaerythritol etc., monosaccharides such as glucose etc., disaccharides such as maltose, or oligosaccharides such as galactooligosaccharides, or the like. At least one of these compounds can be used.

The above high molecular weight compounds include, for example, polyvinyl alcohol (PVA), ethylene-vinyl alcohol copolymer, polysaccharides such as starch, or the like. At least one of these compounds can be used. The saponification degree of said polyvinyl alcohol, ethylene-vinyl alcohol copolymer, etc. is not limited, but it is preferable that the degree of saponification is 95 mol % or higher, and preferably 98 mol % or higher in particular. Furthermore, the average degree of polymerization of polyvinyl alcohol, ethylene-vinyl alcohol copolymer, or the like is preferably from about 50 to about 2,000 in general, and especially from 200 to 1,000 is more preferable.

In the present invention, each of these polyalcohols can be used alone or in combination of two or more. In the present invention, polyvinyl alcohol is particularly suitable.

The ratio of polycarboxylic acid to polyalcohol in the gas barrier layer (II) is not limited as long as the desired effect can be obtained, but the molar ratio of OH groups to COOH groups (OH groups/COOH groups) can normally be 0.01 to 20, and further 0.01 to 10 is more preferred, especially 0.02 to 5 is further preferred, among them 0.04 to 2 is the most preferable.

The gas barrier layer (II) can also contain polyacrylamide, polymethacrylamide or polyamine. By including the compound, the polycarboxylic acid in the gas barrier layer (II) reacts with the compound in addition to reacting with the metal components in the plastic base material (I), thereby further improving the gas barrier properties.

As the aforementioned polyacrylamide, polymethacrylamide or polyamine, known or commercially available products can be used. In particular, polyamines having at least one amino group selected from primary amino groups or secondary amino groups in the molecule can be used. Examples include polyarylamine, polyvinylamine, branched polyethyleneimine, linear polyethyleneimine, polysaccharides having amino groups in the side chain such as polylysine and chitosan, and polyamides with amino groups in the side chain such as polyarginine. The weight-average molecular weight of polyamine is not particularly limited, but usually from about 5,000 to about 150,000 is preferably employed. If the weight-average molecular weight of the polyamine is too low, the resulting gas barrier layer (II) may become brittle. On the other hand, if the weight-average molecular weight of polyamine is too high, handling ability may be impaired, and in some cases, aggregation occurs in a coating liquid for forming the gas barrier layer (II) as described below, the gas barrier properties of the resulting gas barrier layer (II) may be impaired.

The mass ratio of polyamine to polycarboxylic acid (polyamine/polycarboxylic acid) in the gas barrier layer (II) is not particularly limited, but the mass ratio of about 12.5/87.5 to about 27.5/72.5 is preferable. If the polyamine content ratio is too low, cross-linking of the carboxyl groups of the polycarboxylic acid may be insufficient. If the content ratio of polyamine is too high, cross-linking of the amino groups of polyamine may become insufficient. As a result, in either case, the resulting gas barrier laminate may have inferior gas barrier properties.

The gas barrier layer (II) may contain a crosslinking agent. By including a crosslinking agent, the gas barrier properties can be further enhanced. The content of the crosslinking agent in the gas barrier layer (II) may be 0.1 to 30 parts by mass, and especially 1 to 20 parts by mass for 100 parts by mass of polycarboxylic acid is more preferred. The crosslinking agents include a) compounds having self-crosslinking ability and b) compounds having two or more functional groups in the molecule that react with carboxyl groups. When the gas barrier layer (II) contains a polyalcohol, a compound having multiple functional groups in the molecule that react with hydroxyl groups is also acceptable. Preferred crosslinking agents include, for example, at least one selected from the group consisting of isocyanate compound, melamine compound, urea compound, epoxy compound, carbodiimide compound, zirconium salt compounds such as ammonium zirconium carbonate, metal alkoxide, or the like.

Metal alkoxide is a compound containing a metal to which an alkoxy group is bonded, and an alkyl group substituted with a functional group having reactivity with a halogen or carboxyl group may be bonded to the metal in place of some of the alkoxy groups.

Herein, the metal in the metal alkoxide includes, for example, at least one atom of Si, Al, Ti, Zr, or the like. The metal in the present invention also includes semimetals such as Si.

The halogen mentioned above includes at least one type of atom such as chlorine, iodine, bromine, etc. As the functional group having reactivity with the carboxyl group mentioned above, at least one type of epoxy group, amino group, isocyanate group, ureido group, or the like can be used, for example. Furthermore, at least one of the aforementioned alkyl groups includes, for example, methyl, ethyl, n-propyl, iso-propyl, n-butyl, iso-butyl, or the like.

Specific examples of such metal alkoxides include at least one type of alkoxysilane compounds such as tetramethoxysilane, tetraethoxysilane, chlorotriethoxysilane, 3-glycidoxypropyltrimethoxysilane, 3-glycidoxypropyltriethoxysilane, 3-aminopropyltrimethoxysilane, 3-aminopropyltriethoxysilane, 3-ureidopropyltriethoxysilane, 3-isocyanatepropyltriethoxysilane, or the like, alkoxytitanium compounds such as tetraisopropoxy titanium, tetraethoxy titanium, or the like, alkoxyaluminum compounds such as triisopropoxyaluminum, or the like, alkoxyzirconium compound such as tetraisopropoxyzirconium, or the like.

The metal alkoxides may be partially or fully hydrolyzed, partially hydrolyzed and then condensed, fully hydrolyzed and then partially condensed, or a combination thereof.

When the above metal alkoxide and polycarboxylic acid are mixed, the two may react and make coating difficult. Accordingly, it is preferable to form hydrolysis condensate in advance before mixing. As for the method of forming the hydrolysis condensate, any method used in the known sol-gel method can be employed.

The gas barrier layer (II) can contain additives such as heat stabilizers, antioxidants, reinforcing materials, pigments, anti-degradation agents, weather resistant agents, flame retardants, plasticizers, mold release agents, lubricants, preservatives, wetting agents, viscosity regulators, and defoaming agents, or the like as long as the gas barrier properties and adhesion with the plastic base material (I) are not significantly compromised. Heat stabilizers, antioxidants or anti-degradation agents include, for example, hindered phenols, phosphorus compounds, hindered amines, sulfur compounds, copper compounds, halides of alkali metals, or the like. These compounds may be used singly or in combination of one or more.

In particular, reinforcement materials include, for example, clay, talc, wollastonite, silica, alumina, calcium silicate, sodium aluminate, sodium aluminosilicate, magnesium silicate, glass balloon, carbon black, zeolite, montmorillonite, hydrotalcite, fluorite, metal fiber, metal whisker, ceramic whisker, potassium titanate whisker, boron nitride, graphite, glass fiber, carbon fiber, fullerene (C60, C70, etc.), carbon nanotubes, or the like.

The total content of these additives is usually, but not limited to, about 5 mass % or less in the metal-containing layer. In particular, when an antifoaming agent is used as an additive, the content can be about 0.01 to about 1.00 mass % in the gas barrier layer (II), especially 0.10 to 0.50 mass %.

In the present invention, the thickness of the above gas barrier layer (II) laminated to the plastic base material (I) is not particularly limited, but from the viewpoint of sufficiently increasing the gas barrier properties of the gas barrier laminate, a thickness more than 0.05 μm is preferred, especially at least 0.10 μm is more preferred, and at least 0.15 μm is most preferable. From the viewpoint of economic efficiency, it is preferable to be thinner than 5.00 μm, especially 1.00 μm or less is more preferable, and among them, 0.50 μm or less is most preferable. Thus, for example, it can be set in the range from 0.06 to 4.50 μm, and also in the range of from 0.20 to 0.40 μm, for example.

(2) Layer Composition and Characteristics of the

Inventive Laminate The basic composition of the present laminate includes a plastic substrate (I) containing a metal-containing layer and a gas barrier layer (II). As long as the metal-containing layer (M) and the gas barrier layer (I I) are in contact, it may consist of one or two or more layers each as described above.

In the present invention, especially when the plastic base material (I) is a multi-layer film, examples of the composition of the present laminate include "(R)/(M)/(II)", "(M)/(R)/(M)/(II)", "(II)/(M)/(R)/(II)" "(II)/(M)/(R)/(M)/(II)", or the like. In these configurations, gas barrier properties can be obtained efficiently because the gas barrier layer (II) and the metal-containing layer (M) are in contact, and the polycarboxylic acid in the gas barrier layer (II) and the metal component in the metal-containing layer (M) can thereby react easily. Among them, the above-mentioned "(R)/(M)/(II)" structure, or the like is preferred in consideration of the facilities for manufacturing, operability, and the like.

The present laminate exhibits, after hot water treatment of the laminate at a temperature of 95° C. for 30 minutes, the properties that an oxygen transmission rate measured under a temperature of 40° C. and a humidity of 90% RH is 300 ml/(m$^2$·day·MPa) or less. As a result, according to the laminate of the present invention, excellent gas barrier properties can be obtained.

In particular, it is preferable that the laminate after the above hot water treatment has an oxygen transmission rate of 300 ml/(m$^2$·day·MPa) or less measured at (a) temperature of 20° C. and humidity of 65% RH, (b) temperature of 20° C. and humidity of 90% RH, (c) temperature of 30° C. and humidity of 80% RH and (d) temperature of 40° C. and humidity of 90% RH. From the viewpoint of preventing rotting of contents, especially, the oxygen transmission rate after hot water treatment is more preferably 200 ml/(m$^2$·day·MPa) or less, and most preferably 100 ml/(m$^2$·day MPa) or less under any one of the above conditions (a) to (d). It is preferred that the lower limit of the oxygen transmission rate of (a) above is preferably closer to 0 ml/(m²·day·MPa), and the lower limit can be set to 1 ml/(m²·day·MPa), for example, but not limited to this. The lower limit of oxygen transmission rate in (b) above is preferably closer to 0 ml/(m²·day·MPa), and the lower limit can be set to 1 ml/(m²·day·MPa) for example, but not limited to this. The lower limit of oxygen transmission rate in (c) above is preferably closer to 0 ml/(m²·day·MPa), and the lower limit can be set to 1 ml/(m²·day·MPa) for example, but not limited to this. The lower limit of the oxygen transmission rate of (d) above is preferably closer to 0 ml/(m²·day·MPa), and the lower limit can be set to 20 ml/(m²·day·MPa) for example, but not limited to this.

It is preferable that the tensile strength of the present laminate be 150 MPa or higher in a tensile test measured at a temperature of 23° C. and humidity of 50% RH in accordance with the Japanese Industrial Standard JIS K7127, and it is more preferable that the tensile strength is 180 MPa or higher. If the tensile strength is less than 150 MPa, the mechanical strength may be insufficient and the sticking strength tends to decrease. Thus, for example, it can be set to about 150 to about 300 MPa, but is not limited to this range. Further, the tensile elongation in a tensile test measured at a temperature of 23° C. and humidity of 50% RH environment according to JIS K7127 is preferably 60% or more, and more preferably 80% or more in view of the same perspective as tensile strength. Thus, for example, it can be set the range from about 60% to about 95%, but is not limited to this range.

For the pinhole resistance of the present laminate, it is preferable that the number of pinholes generated in a 500 times repeated bending fatigue test under an atmosphere of 5° C. is 100 pieces or less, and especially it is more preferable that the number is 20 pieces or less. The above pinhole resistance is evaluated according to ASTM F392 by measuring the number of pinholes generated after 500 cycles of bending at a temperature of 5° C. with a Gelboflex tester (manufactured by Tester Sangyo, for example). The lower limit of the number of pinholes generated is preferable as close to 0, and can be set to 0, for example, but is not limited to this.

As to the transparency of the present laminate, haze value as measured under a temperature of 23° C. and humidity of 50% RH according to the Japanese Industrial Standard JIS K7136 is preferably 70% or less, 50% or less is more preferred, 30% or less is further preferred, 15% or less is particularly preferred, and 10% or less is most preferred. On the other hand, In an application that transparency may not be required, the haze is not limited to the above values.

The total thickness of the laminate should be 100 μm or less, and can be set within the range according to applications. From the viewpoint of reducing the amount of material used, bag-making processability, etc., the thinner the total thickness of the laminate, the better, especially 50 μm or less is preferable, and among these, 30 μm or less is most preferable. From the viewpoint of barrier properties, the thicker the layer thickness of the laminate, the better, especially 5 μm or more, and among them, 10 μm or more is more preferable. Accordingly, for example, the thickness can be set in the range of 6 to 40 μm, and also in the range of 12 to 25 μm, for example.

2. Method of Manufacturing Gas Barrier Laminate

The gas barrier laminate of the present invention can be produced by any of the above methods as long as it has the above features, but in particular, by employing the following method: a method for manufacturing a gas barrier laminate, wherein the method comprises steps of (1) preparing a coating liquid for forming a gas barrier layer by passing a raw material liquid containing a polycarboxylic acid through a filter having a filtration accuracy of 1.0 to 10.0 μm (Coating liquid preparation step); and (2) applying the coating liquid to at least a surface of a metal-containing layer of a plastic base material (I) including the metal-containing layer containing a resin component and at least one selected from the group consisting of a metal and metal compound (Coating liquid application step), to produce the laminate suitably.

Coating Liquid Preparation Step

In the coating liquid preparation step, the coating liquid for forming the gas barrier layer is prepared by passing the raw material liquid containing the polycarboxylic acid through a filter having a filtration accuracy of 1.0 to 10.0 μm.

The raw material liquid containing polycarboxylic acid is preferably water-based liquid from the viewpoint of workability. Therefore, it is preferable that polycarboxylic acid, as well as polyalcohols, polyamines, etc., which are optional ingredients, be water-soluble or water-dispersible, and it is more preferable that they are water-soluble.

As polycarboxylic acids, various polycarboxylic acids listed in "1. Gas barrier laminates" above can be used.

The raw material liquid can be an aqueous solution or aqueous dispersion of polycarboxylic acid prepared by mixing polycarboxylic acid and water. In this case, the concentration of the polycarboxylic acid is not limited and can be set within the range of about 5 to about 30% by mass, for example.

Further, when aqueous raw material liquid is prepared with polyalcohol, the type of polyalcohol used, the ratio of polycarboxylic acid to polyalcohol, additives, etc., can be selected in accordance with the description in "1. Gas barrier laminate" above. In this case, it is preferable to add an alkali compound at 0.1 to 20 equivalent percent to the carboxyl group of the polycarboxylic acid. Since polycarboxylic acid becomes more hydrophilic when the carboxyl group content is higher, it can be made into an aqueous solution even without the addition of an alkali compound. In such a case, the gas barrier properties of the resulting gas barrier laminate can be greatly improved by adding the appropriate amount of alkali compound.

For example, at least one of sodium hydroxide, potassium hydroxide, calcium hydroxide, sodium carbonate, ammonia water, or sodium bicarbonate, etc. can be listed as the alkali compound above. The amount of alkali compound added can usually be 0.1 to 20 mol % of the carboxyl group of the polycarboxylic acid.

In the present invention, when a water-based coating solution is prepared by mixing polycarboxylic acid and polyamine, it is preferable to add a base to the polycarboxylic acid in order to inhibit gelation.

The above base may be any base that does not inhibit the gas barrier properties of the resulting gas barrier laminate. Examples include inorganic compounds such as sodium hydroxide and calcium hydroxide or the like, and organic compounds such as ammonia, methylamine, diethanolamine, or the like. These can be used in one or more types. Of these, ammonia is preferred because it is easily volatilized by drying and heat treatment. The amount of base added is usually 0.6 equivalents or more to the carboxyl group of the polycarboxylic acid, and especially 0.7 equivalents or more is more preferred, and 0.8 equivalents or more is the most preferred. If the amount of base added is smaller, the coating liquid may gel during coating, and the gelatinization may make it difficult to form the gas barrier layer (II) on the plastic substrate (I).

The raw material liquid can be prepared by mixing each of these components. In this case, mixing can be carried out using a melting pot equipped with a stirrer or the like. Although the mixing procedure is not limited, it is preferable that the method of preparing aqueous solution of polycarboxylic acid and aqueous solution of polyalcohol separately and mixing them before coating is particularly preferred. At this time, if the above alkali compound is added to the aqueous solution of polycarboxylic acid, the stability of the aqueous solution can be improved.

The raw material liquid may contain other additives as long as they do not substantially adversely affect the advantages of the present invention. As additives, various additives listed in "1. Gas barrier laminate" above can be used. In particular, in the manufacturing method of the present invention, it is preferable to include a defoaming agent from the viewpoint of inhibiting foaming of the above raw material liquid or promoting breaking of the foam that has already been generated.

The type of the defoaming agent is not particularly limited, but includes any mineral oil type, vegetable oil type, water-based emulsion type, silicone type, or the like can be used, and can be selected according to the application and the like. As these defoaming agents, well-known or commercially available products are used. The defoaming agent may be in a solid form or liquid form.

The average particle diameter of the defoaming agent is not particularly limited, but from the viewpoint of improving the antifoaming effect and inhibiting coat loss, it is preferable that the average particle diameter is 0.10 to 5.00 μm, especially 0.15 to 3.00 μm is more preferable, of which 0.20 to 1.00 μm is most preferable. By setting the average particle diameter of 0.10 μm or more, a defoaming effect can be obtained, and by setting the particle diameter of 5.00 μm or less, coat loss can be inhibited, resulting in more effective prevention of degradation of gas barrier properties, especially under high temperature and high humidity environments. The above average particle diameter indicates the droplet diameter when the defoaming agent is a liquid or used as a liquid.

Methods for adjusting the average particle diameter of the defoaming agent to the above preferred range are not particularly limited, and include, for example, rotary agitation with a disperser, ultrasonic agitation with a homogenizer, pressurization with a pump to pass through a filter having appropriate filtration accuracy, and a combination of two or more of these methods.

From the viewpoint of improving the defoaming effect or inhibiting coating defect, the content of the defoaming agent is preferably 0.001 mass % to 0.100% by mass in the total amount of the raw material liquid including water, and more preferably 0.010 to 0.050 mass %. When the content of the defoaming agent is 0.001 mass % or more, the defoaming effect is achieved, and when the content is 0.100% or less, coating defect can be inhibited and the degradation of gas barrier property, especially under high temperature and high humidity environments, can be prevented.

The coating liquid for forming the gas barrier layer is prepared by passing the raw material liquid thus obtained through a filter with a filtration accuracy (absolute filtration accuracy) of 1.0 to 10.0 μm. Surprisingly, by employing the aforementioned coating liquid preparation step, a film that exhibits high gas barrier performance, especially in high temperature and high humidity environments of 40° C. and 90% RH can be obtained. The reason for this has not yet been clarified, but according to a postulation, the following is thought to be the cause. By passing the raw material liquid through a filter, air bubbles contained in the raw material liquid can be removed or subdivided, and coarse particles in the raw material liquid can also be removed. In addition, the aggregates of polycarboxylic acid and/or polyalcohol in the raw material liquid are subdivided, and the reaction between polycarboxylic acid and polyalcohol and the reaction between polycarboxylic acid and metal components can thereby occur more closely when forming the gas barrier layer. As a result, an overall homogeneous film that is virtually free of pores, cracks, and other defects can be obtained.

Filters with a filtration accuracy of 1.0 to 10.0 μm are used as the filter, in particular, but filters with a filtration accuracy of 2.0 to 5.0 μm are more preferred. If a filter with a filtration precision of less than 1.0 μm is used, the diameter of the defoaming agent particles after passing through the filter may become too small to achieve a sufficient antifoaming effect when the defoaming agent described below is used, which may cause coat loss due to foam. In addition, if a filter having a filtration accuracy larger than 10.0 μm is used, the desired filtering effect cannot be obtained, and when a defoaming agent is used, the defoaming agent particle diameter after passing through the filter becomes too large, causing so-called coat loss due to repelling caused by the defoaming agent. In addition, the aggregates of polycarboxylic acid or polyalcohol in the raw material liquid are not fully subdivided, and the reactions between polycarboxylic acid and polyalcohol, and between polycarboxylic acid and metal components during gas barrier layer formation may become non-uniform. If coat loss occurs in any cases or if the reaction of polycarboxylic acid, polyalcohol, and metal components becomes non-uniform due to aggregates, the gas barrier properties may deteriorate under high temperature and high humidity environments of 40° C. and 90% RH.

In order to improve filtration efficiency and filtration performance, it is preferable to pass the raw material liquid through the filter under pressure. The pressure can normally be in the range of 0.1 to 0.3 MPa, and preferably 0.15 to 0.25 MPa. If the pressure is less than 0.1 MPa, the filtration efficiency is low and the filter has little effect on turning the defoaming agent into fine particles. On the other hand, if the pressure is greater than 0.3 MPa, there is concern about filter breakdown. In the present invention, an ordinary pressurizing device (pump, etc.) can be used as the pressurizing means.

The filter device is not limited as long as the filtration accuracy is in the range of 1.0 to 10.0 μm. For example, a filter device including (a) a filter housing, (b) a filter installed in the filter housing, and (c) a pump for pressurized injection of a raw material liquid into the filter can be used.

Any type of filter (cartridge filter), such as metal mesh, filter cloth, nonwoven fabric laminate, resin molded body, ceramic molded body, or the like can be suitably used. The shape of the filter is also not limited, for example, a cylindrical (so-called "chikuwa" that is a tube-shaped fish paste cake) shaped filter can be used. The size can be, for example, but is not limited to, an outer diameter of about 50 to about 100 mm, an inner diameter of about 10 to about 30 mm, and a length of about 200 to about 1000 mm for a cylindrical shape. These devices and other equipment can also be used that are publicly known or commercially available.

The treatment method by the filter can be either continuous or circulating. The number of times in which the liquid is passed through the filter may be once, twice or more (multi-stage type). Thus, for example, a method in which, after passing through a first filter with a filtration accuracy of 1.0 to 10.0 μm, a second filter with a filtration accuracy of 1.0 to 10.0 μm and smaller than the first filter can be employed.

In the present invention, the viscosity of the raw material liquid when passing through the filter is not particularly limited, but the viscosity measured at a liquid temperature of 25° C. using a B-type viscometer is preferably within the range of about 5.0 to about 50.0 mPa·s. Thus, for example, it may be also set within the range of 10.0 to 40.0 mPa·s. By setting the liquid viscosity before passing through the filter within the above range, the subdivision of bubbles can be further promoted and the accuracy of a defoamer particle size control can be further improved. It is also expected to promote the subdivision of polycarboxylic acid and polyalcohol aggregates. Therefore, when the viscosity of the coating liquid before passing through the filter is outside the above range, the viscosity of the coating liquid can be adjusted as necessary.

Coating Liquid Application Step

In the coating liquid application step, the coating liquid for forming the gas barrier layer is applied to at least the surface of the metal-containing layer of a plastic base material (I) including a metal-containing layer containing a resin component and at least one metal or metal compound.

The plastic base material (I) can be used in the same manner as described in "1. Gas barrier laminate" above, for example, a film pre-formed from resin-containing raw materials can be used. The manufacturing method of the plastic base material (I) is also not limited, and for example, a plastic base material (I) manufactured as follows can be used.

In the case of plastic base material (I) consisting of a single-layer film, for example, thermoplastic resin mixed with a metal component is heated and melted in an extruder, extruded from a T-die into a film shape, and then cooled and solidified on a rotating cooling drum by a known casting method such as an air knife casting method or electrostatic application casting method, or the like, and thereby a film can be obtained in an unstretched state. This film can be used as the plastic base material (I).

In the case of plastic base material (I) consisting of a multi-layered film, for example, thermoplastic resin mixed with metal components is heated and melted in extruder A and thermoplastic resin is heated and melted in extruder B, and the two melted resins are overlapped in the die, for example, a film having a two-layer structure of metal-containing layer (M)/resin layer (R) is formed by extruding from the T-die, and then by cooling and solidifying the film in the same manner as described above to obtain a film in an unstretched state. The film thus obtained can be used as plastic base material (I). By including a metal in the plastic base material (I) in each of these methods, a step of laminating a layer containing a metal component to the base material can be omitted.

The method of applying the coating liquid for forming the gas barrier layer (II) to the plastic substrate (I) is not particularly limited, and includes one or more of air knife coater, kiss roll coater, metering bar coater, gravure roll coater, reverse roll coater, dip coater, die coater, or the like.

After the coating liquid for forming the gas barrier layer (II) is applied to the plastic substrate (I), a drying step can be performed in order to dry the coating film, if necessary.

The drying method is not particularly limited and includes, for example, a) a method in which heat treatment is performed immediately after coating to perform forming of a dried film and heat-treating simultaneously, b) a method in which, after coating, a dried film is formed by evaporating moisture, etc. by blowing hot air using a dryer, or by infrared irradiation, or the like, followed by heat treatment.

In the present invention, it is preferable to perform heat treatment immediately after coating, unless the state of the gas barrier layer (II) and properties such as gas barrier properties are particularly affected.

The heat treatment method is not particularly limited, and includes heating in a drying atmosphere such as an oven and the like. Considering the shortening of the process, it is preferable to stretch the plastic base material (I) after coating with the coating liquid for forming the gas barrier layer (II). In any of the above cases, it is preferable to heat treat the plastic base material (I) on which the gas barrier layer (II) is formed for 5 minutes or less in a heated atmosphere of 100° C. or higher.

In the case where the gas barrier layer (II) contains polycarboxylic acid and polyalcohol, the temperature of the heat treatment after applying the coating liquid can be influenced by the ratio of the two, the presence or absence of additive components, the content of additive agents or the like. Accordingly, the heat treatment temperature after the application of the coating liquid is not limited to, but usually from about 100 to about 300° C. preferably, in particular, it is more preferable to set the temperature at 120 to 250° C., and even more preferable to set the temperature at 140 to 240° C., and the most preferable to set the temperature at 160 to 220° C. If the heat treatment temperature is less than 100° C., the crosslinking reaction between the polycarboxylic acid and the polyalcohol cannot sufficiently progress, and it may be difficult to obtain a laminate having sufficient gas barrier properties. On the other hand, if the heat treatment temperature exceeds 300° C., the gas barrier layer (II) or the like may become brittle.

The heat treatment time can normally be 5 minutes or less, 1 second to 5 minutes is more preferable, 3 seconds to 2 minutes is even more preferable, and 5 seconds to 1 minute is most preferable. If the heat treatment time is too short, the above cross-linking reaction cannot sufficiently progress, making it difficult to obtain a laminate with gas barrier properties. On the other hand, if the heat treatment time is too long, the productivity will decline.

The coating liquid (coating film) for forming the gas barrier layer (II) applied on the plastic base substrate (I) may be subjected to high-energy ray irradiation treatment such as ultraviolet rays, X-rays, electron beams, etc., before and/or after drying as described above, as necessary. In such cases, components that are able to cross-link or polymerize by high-energy ray irradiation may be blended.

Stretching Step

In the present invention, it is preferred that a stretching step further includes a process in which the laminate coated with the coating liquid for forming the gas barrier layer is subjected to simultaneous biaxial stretching or sequential biaxial stretching.

The stretching method can be either simultaneous biaxial stretching or sequential biaxial stretching, but the simultaneous biaxial stretching method is particularly preferred. Generally, according to the simultaneous biaxial stretching method, practical properties such as mechanical properties, optical properties, thermal dimensional stability, and pinhole resistance can be combinedly obtained at the same time. In addition, in the sequential biaxial stretching method, in which transverse stretching is performed after longitudinal stretching, the film tends to break more frequently when the amount of metal components is high, because the orientation crystallization of the film progresses during longitudinal stretching and the stretchability of the thermoplastic resin during transverse stretching is reduced. Therefore, in the present invention, it is preferable to carried out water absorption treatment and then employ the simultaneous biaxial stretching method.

In the case of simultaneous biaxial stretching, for example, the coating liquid for forming the gas barrier layer (II) is applied to the plastic substrate (I) to form the gas barrier layer (II), and then simultaneous biaxial stretching in the longitudinal (MD) and transverse (TD) directions is performed in a tenter-type simultaneous biaxial stretching machine to obtain a gas barrier laminate that has been stretched in the simultaneous biaxial direction.

In the case of sequential biaxial stretching, for example, the resulting unstretched film is stretched in the longitudinal direction (MD), coated with the coating liquid for forming the gas barrier layer (II) in the manner described above to form the gas barrier layer (II), and then stretched in the transverse direction (TD) to obtain a sequentially biaxially oriented gas barrier laminate.

It is preferable that the unstretched film be substantially amorphous and unoriented, because its stretchability may be reduced in the subsequent process if the unstretched film is oriented.

When polyamide resin is used as the plastic base material (I), it is preferable to transfer the unstretched film to a water tank that is temperature-controlled so that the temperature does not exceed 80° C., and subject it to a water immersion treatment within 5 minutes and 0.5 to 15% moisture absorption treatment. The film can be stretched at least 1.5 times in the case of uniaxial stretching, and at least 1.5 times each in the vertical and horizontal directions in the case of horizontal and vertical biaxial stretching. For area magnification, it is usually preferable to use an area magnification of 3 times or more, more preferably 6 to 20 times, of which 6.5 to 13 times is the most preferable. When the drawing ratio is in the above range, it is possible to obtain gas barrier laminates with superior mechanical properties. Stretching temperature is also not limited, and can be performed within a range of 40-220° C., for example. In particular, in the case of sequential stretching, stretching temperature in the MD direction is preferably 40 to 80° C., and stretching temperature in the TD direction is preferably 80 to 150° C. Further, in the case of simultaneous biaxial stretching, the temperature is preferably 160 to 220° C.

Films that have undergone the stretching step can be subjected to heat fixing and relaxing step, or the like, as necessary. In this case, the temperature in the heat fixing step can be set as appropriate, usually within the range of about 150 to about 300° C. For example, it can be set to 200 to 230° C. The time for the heat fixation step can be changed according to the temperature and other factors, usually within the range of 1 to 30 seconds, and can be set to 1 to 5 seconds, for example, but not limited to this range. The relaxation step may normally be relaxed in the longitudinal and/or transverse direction within a relaxation rate of about 0 to 10% (preferably 2 to 6%). The temperature in the relaxation step can be set appropriately within the range of about 150 to about 300° C. as in the heat fixation process, but it is desirable to set a temperature lower than the maximum temperature of the heat fixation process in order to ensure more reduction in thermal shrinkage. For the heat fixing step, the relaxation step, for example, it is preferable to perform the relaxation process continuously after heat fixing in a tenter in which the stretching step has been performed.

The gas barrier laminate of the present invention can also be treated under a humidified atmosphere after the laminate is manufactured, especially for the purpose of enhancing gas barrier properties. The humidification treatment can further promote the reaction of the metal component in the plastic base material (I) and the polycarboxylic acid in the gas barrier layer (II). Such humidification treatment can be performed by leaving the laminate in an atmosphere under high temperature and high humidity, or by directly contacting the laminate with hot water. The humidification treatment conditions vary depending on the purpose and other factors, but in the case of leaving the laminate in a high temperature and high humidity atmosphere, a temperature of 30 to 130° C. and a humidity of 50 to 100% RH are preferred. In the case of contact with high temperature water, a temperature of about 30 to about 130° C. (100° C. or higher under pressure) is also preferable. The humidification treatment time varies depending on treatment conditions, etc., but can generally be set appropriately in the range from a few seconds to several hundred hours.

The gas barrier laminate of the present invention may be subjected to surface treatment, such as corona discharge treatment, if necessary. These treatment methods themselves can be performed according to known methods.

3. Use of Gas Barrier Laminate

The laminate of the present invention may be used in its as-is form, a form including the laminate and other layer(s) laminated on the laminate may be used so as to not adversely affect the advantages of the invention. The other layers are not limited, and include, for example, a base layer of polyester, polyamide, or the like, a sealant layer, a barrier layer, an antistatic layer, a mold release layer, a printing layer, or the like. These layers can be used either individually or in combination of two or more thereof.

Resins used as the sealant layer include, for example, at least one selected from the group of low-density polyethylene, medium-density polyethylene, high-density polyethylene, linear low-density polyethylene, polypropylene, polyethylene/polypropylene copolymer, ethylene-vinyl acetate copolymer, ionomer resin, ethylene-acrylic acid/methacrylic acid copolymer, ethylene-acrylic acid/methacrylic acid ester copolymer, polyvinyl acetate resin, or the like. Among these, at least one polyolefin resin selected from a group consisting polyethylene, polypropylene, polyethylene/polypropylene copolymer, or the like is preferred from the point of view of high heat-sealing strength or the strength of the material itself.

These resins may be used alone, copolymerized or melt-mixed with other resins, or even acid modified. The method of forming the sealant layer on the gas barrier laminate is not limited, and includes, for example, a method of laminating a film or sheet made of the sealant resin on the gas barrier laminate via an adhesive, or a method of extrusion laminating the sealant resin on the gas barrier laminate. In the former method, the film or sheet comprising the sealant resin may be in an unstretched or low-magnification stretched state, but for practical purposes, the unstretched state is preferred.

The thickness of the sealant layer is not particularly limited and can usually be set appropriately within the range of about 20 to about 95 μm, in particular 40 to 70 μm is more preferred.

As a barrier layer, a barrier layer or the like employed in known films can be used. For example, a polyvinylidene chloride copolymer layer can be used as a barrier layer.

The present laminate can be used in various applications where its properties can be utilized. In particular, it can be suitably used as a packaging material for heat sterilization treatment using hot water or steam, such as boiling or retorting for food packaging. In particular, the present laminate can be used more preferably as a packaging bag, and moreover, as a packaging bag for sealing contents inside the packaging bag.

Such packaging bags can be used, for example, for packing or filling various liquid contents and/or solid contents such as various food and beverage products including beverages, fruits, juices, drinking water, liquors, cooked foods, fish paste products, frozen foods, meat products, boiled foods, bamboo shoots, corn, pickles, pickles, rice cakes, liquid soup, seasonings, and other foods and beverages, and such as liquid detergents, cosmetics, chemical products, or the like.

When used as a packaging bag, the form is not limited, and can be applied to any of the following types of bags: two-side bags, three-side bags, three-side bags with zipper, pillow bags, gusset bags, bottom gusset bags, stand bags, stand zipper bags, two-side bags, four-poster flat bottom gusset bags, side seal bags, and bottom seal bags.

In addition to packaging materials for packaging contents such as food products as described above, the laminate of the present invention can also be suitably used as a lid material for cup containers (cup products) such as jellies, puddings, etc., and for squeeze packaging.

EXAMPLES

Examples and comparative examples are given below to more concretely explain the features of the invention. However, the scope of the present invention is not limited to the examples.

1. Raw Materials Used

The raw materials used in the examples and comparative examples are as follows.

(1) Thermoplastic Resin for Plastic Base Material (I)
PA6: Nylon 6 resin (A1030BRF, relative viscosity 3.0, manufactured by Unitika LTD.)
PET: Polyethylene terephthalate resin (UT-CBR, extreme limit viscosity 0.62, manufactured by Unitika LTD.)

(2) Metal or Metal Compound for Plastic Base Material (I) Composition
MgO: Magnesium oxide (PUREMAG FNM-G, average particle diameter 0.5 μm, manufactured by Tateho Chemical Industry Co.)
MgO-2: Magnesium oxide (TATEHOMAG #H-10, average particle diameter 4.9 μm, manufactured by Tateho Chemical Industry Co.)
MgCO$_3$: Magnesium carbonate (MSS manufactured by Konoshima Chemical Co., Ltd. Average particle diameter 1.2 μm)
CaCO$_3$: Calcium carbonate (Vigot15, average particle diameter 0.5 μm, manufactured by Shiraishi Kogyo,)
ZnO: Zinc oxide (FINEX-50, average particle diameter 0.02 μm, manufactured by Sakai Chemical Industry)

(3) Polycarboxylic Acid Component of Coating Liquid for Forming Gas Barrier Layer (II)
EMA Aqueous Solution:
EMA aqueous solution in which 10 mol % of the carboxyl groups of EMA was neutralized by sodium hydroxide, prepared by adding EMA (weight-average molecular weight 60,000) and sodium hydroxide to water, heating to dissolve, and cooled to room temperature.

PAA Aqueous Solution:
An aqueous solution of polyacrylic acid (PAA) having a solid content of 15 mass % in which 10 mol % of the carboxyl groups of the polyacrylic acid was neutralized by sodium hydroxide, prepared by using polyacrylic acid (A10H, manufactured by Toagosei, 200,000 average molecular weight, solid content 25 mass %, aqueous solution) and sodium hydroxide P (AA-MA):
Acrylic acid-maleic anhydride copolymer aqueous solution (manufactured by ALDRICH, weight-average molecular weight 3,000, solid content 50 mass %)

(4) Other Resin Components of Coating Solution for Forming Gas Barrier Layer (II)
PVA Aqueous Solution:
An aqueous solution of polyvinyl alcohol (PVA) having a solid content of 15 mass % prepared by adding polyvinyl alcohol (5-98, saponification degree 98-99%, average degree of polymerization 500, manufactured by Kuraray) to water, heating to dissolve, and cooling to room temperature.

EVOH Aqueous Solution:
An aqueous solution of ethylene vinyl alcohol copolymer (EVOH) with a solid content of 10 mass % prepared by dissolving ethylene vinyl alcohol copolymer (EXCEVAL AQ-4105 manufactured by Kuraray)
Starch: Soluble starch manufactured by Wako Pure Chemical Industries, Ltd.
PAM: Polyacrylamide (reagent, weight-average molecular weight 9-10 million, degree of polymerization 127,000-141,000, manufactured by Kishida Chemical Co.)

(5) Defoaming Agent
The following deforming agents were used with the coating liquid for forming the gas barrier layer (II).
Mineral oil-based deforming agent 1: AGITAN282 manufactured by MUNZING CHEMIE GmbH
Mineral oil-based deforming agent 2: SN Deformer 154S manufactured by Sannopco
Polyether-based deforming agent: SN Deformer 180 manufactured by Sannopco
Acetylene glycol-based deforming agent: Orfin AF-103 manufactured by Nissin Chemical Industry Co.
Vegetable oil-based deforming agent: AGITAN 271 manufactured by MUNZING CHEMIE GmbH
Silicone deforming agent 1: 95 ANTIFOAM EMULSION manufactured by Toray Dow Corning
Silicone deforming agent 2: AK350 manufactured by Asahi Kasei Wacker Silicone Co., Ltd.

2. Examples and Comparative Examples

Example 1

PA6 and MgO were mixed so that the MgO content was 0.5 mass %. The mixture was fed into an extruder and melted in a cylinder at 270° C. The melt was extruded from the T-die orifice into the form of a sheet and cooled rapidly in contact with a rotating drum cooled to 10° C. to obtain an unstretched plastic base material (I) film having 150 μm thickness. The obtained unstretched film was sent to a 50° C. hot water bath and subjected to water immersion treatment for 2 minutes. This plastic base material (I) film consists of a single layer of metal-containing layer (M).

Next, a raw material liquid was prepared by mixing an aqueous PVA solution with an aqueous EMA solution so that the mass ratio (solid content) of PVA to EMA was 30/70 and adding 0.020 mass % of a defoaming agent containing mineral oil as the main ingredient (mineral oil-based defoaming agent 1). The viscosity of this raw material liquid was 15 mPa's as measured with a type B viscometer at a liquid temperature of 25° C. The raw material liquid was then passed through a cartridge filter with a filtration accuracy of 1.0 μm while applying a pressure of 0.10 MPa with a pump to obtain a coating liquid for forming the gas barrier layer (II) with a solid content of 10 mass %.

The coating liquid obtained was applied to one side of the unstretched film that has been subjected to the water immersion treatment, and then dried. The edges of the unstretched film were held in the clips of a tenter-type simultaneous biaxial stretching machine and stretched at 180° C. for 3.3 times MD and TD, respectively. The film was then heat-fixed at 210° C. for 4 seconds, followed by a 5% heat relaxation treatment in the TD direction, and then slowly cooled to room temperature. Thus, a gas barrier laminate with (M)/(II) configuration (total thickness of 15.3 μm) was obtained, in which a gas barrier layer (II) having a thickness of 0.3 μm was laminated onto a plastic substrate (I) having a thickness of 15 μm (i.e., a single layer of metal-containing layer (M)).

Examples 2-7, 10-26, 31-35, Comparative Examples 1-7, 9

Gas barrier laminates with (M)/(II) configuration were obtained in the same manner as in Example 1, except that the composition of the base layer, type and mass ratio of polyalcohol and polycarboxylic acid, metal component content, main component of defoaming agent in the coating liquid, filtering accuracy and pump pressure of the filter were changed as described in Tables 1 to 3. The liquid viscosity of the raw material liquid before passing through the filter was 15 mPa's as measured with a B-type viscometer at a liquid temperature of 25° C.

Example 8

PA6 and MgO were mixed so that the MgO content was 50 mass %. This mixture was fed into extruder A and melted and extruded at 260° C. On the other hand, PA6 was fed into extruder B and melt extruded at 260° C. The two resins melted in extruder A and extruder B, respectively, were overlapped in a die, and a two-layer sheet consisting of a metal-containing layer (M)/resin layer (R) was extruded from the T-die and adhered to a cooling roll with a surface temperature of 10° C. to obtain an unstretched multilayer film with a thickness of 150 μm, where (M)/(R) was 5/145 μm. The resulting unstretched multilayer film was sent to a 50° C. hot water bath and water-immersion treated for 2 minutes.

Next, the coating liquid prepared in the same manner as in Example 1 was applied to the metal-containing layer (M) side of the unstretched multilayer film and then dried, except that the pump pressure, filter filtration accuracy, and PVA/EMA mass ratio were changed as shown in Table 1. The liquid viscosity of the raw material liquid before passing through the filter was 35 mPa-s as measured with a B-type viscometer at a liquid temperature of 25° C. conditions.

Furthermore, simultaneous biaxial stretching and heat treatment carried out in the same way as in Example 1 to obtain (R)/(M)/(II) structure gas barrier laminate, in which a gas barrier layer (II) having a thickness of 0.3 μm was laminated on the metal-containing layer (M) side of the plastic base material (I) having a thickness of 15 μm consisting of the metal-containing layer (M) with a thickness of 0.5 μm and the resin layer (R) with a thickness of 14.5 μm.

Example 9

PET and MgO were mixed so that the MgO content was 0.5 mass %. The mixture was fed into an extruder and melted in a cylinder at 280° C. The melt was extruded from the T-die orifice into a sheet shape and cooled quickly in contact with a rotating drum cooled to 20° C. to obtain an unstretched plastic base material (I) film having a thickness of 150 μm.

Next, the coating liquid prepared in the same manner as in Example 1 was applied to one side of the unstretched film and then dried except that the pump pressure and filter filtration accuracy were changed as shown in Table 1. The liquid viscosity of the raw material liquid before passing through the filter was 15 mPa's as measured with a B-type viscometer at a liquid temperature of 25° C. The edges of the film were held in the clips of a tenter-type simultaneous biaxial stretching machine and stretched 3.3 times in MD and TD at 100° C., respectively. Then, heat-fixing treatment was performed at 220° C. for 4 seconds, followed by 5% heat relaxation treatment in the TD direction, and slow cooling to room temperature to obtain a gas barrier laminate with (M)/(II) configuration, in which a gas barrier layer (II) with a thickness of 0.3 μm was laminated onto a plastic base material (I) with a thickness of 15 μm.

Example 27

After obtaining an unstretched sheet by melting and extruding a melt into a sheet form from a T-die and then cooling rapidly and solidifying in a cooling drum, the sheet was MD stretched 3.3 times by a roll stretching machine at 60° C. without water immersion treatment. And then, the pump pressure and filter filtration accuracy as shown in Table 2. The coating liquid prepared in the same manner as in Example 1 was applied to one side of the MD-stretched film and dried except for the changes made above. The liquid viscosity of the raw material liquid before passing through the filter was 15 mPa-s as measured with a B-type viscometer at a liquid temperature of 25° C. Next, a gas barrier laminate having (M)/(II) configuration was obtained in the same manner as in Example 1, except that the MD-stretched film was TD-stretched 3.3 times at 100° C. using a tenter-type stretching machine, heat-fixed at 205° C., and then subjected to a 5% heat relaxation treatment.

Example 28, Comparative Example 10

A gas barrier laminate with (II)/(M)/(II) configuration was obtained in the same manner as in Example 1, except that the coating liquid for forming a gas barrier layer (II) was applied to the unstretched film and dried, and then the same coating liquid was applied to the opposite side of the coated side of the unstretched film and dried to obtain a resin layer (R) having a thickness of 0.5 μm, and the pump pressure and filter filtration accuracy were changed as shown in Tables 2 to 3. The liquid viscosity of the raw material liquid before passing through the filter was 15 mPa's as measured with a B-type viscometer at a liquid temperature of 25° C.

Example 29, Comparative Example 11

A gas barrier laminate with a PVDC/(M)/(II) composition was obtained in the same manner as in Example 1, except that the coating liquid for forming a gas barrier layer (II) was applied to the unstretched film and dried, and then a coating liquid comprising polyvinylidene chloride copolymer resin ("Saran Latex L536B" manufactured by Asahi Kasei Corporation; solid content concentration 49 mass %) was applied to the opposite side of the coated side of the unstretched film and dried to laminate a PVDC layer having a thickness of 1.5 μm, and the pump pressure and filter filtration accuracy were changed as shown in Tables 2 to 3. The liquid viscosity of the raw material liquid before passing through the filter was 15 mPa·s as measured with a B-type viscometer at a liquid temperature of 25° C.

Example 30

Gas barrier laminate with (M)/(II) composition was obtained in the same manner as in Example 1, except that no defoaming agent was added and the filter filtration accuracy and pump pressure were changed as described in Table 2. The liquid viscosity of the raw material liquid before passing through the filter was 15 mPa's as measured with a B-type viscometer at a liquid temperature of 25° C. conditions.

Comparative Example 8

A gas barrier laminate with (M)/(II) composition was obtained in the same manner as in Example 1, except that the mass ratio of PVA to EMA in the coating liquid, filtering accuracy and pump pressure were changed as described in Table 3. The liquid viscosity of the raw material liquid before passing through the filter was 95 mPa's as measured with a B-type viscometer at a liquid temperature of 25° C. conditions.

Comparative Examples 12-13, 22-24

Gas barrier laminates with (M)/(II) configuration were obtained in the same manner as in Example 1, except that the addition of defoaming agent and filter filtration were not performed and the content of metal components was changed as described in Table 3. The liquid viscosity of the raw material liquid was 15 mPa-s as measured with a B-type viscometer at a liquid temperature of 25° C.

Comparative Examples 14-16

Gas barrier laminates with (M)/(II) configuration were obtained in the same manner as in Example 1, except that the addition of a defoaming agent and filter filtration were not performed, and the content of metal components, thickness of the metal-containing layer (M) and thickness of the gas barrier layer (II) were changed as described in Table 3. The liquid viscosity of the raw material liquid was 15 mPa's as measured with a B-type viscometer at a liquid temperature of 25° C.

Comparative Examples 17-18

Gas barrier laminates with a (M)/(II) composition were obtained according to the same method as in Example 1, except that filter filtration was not performed and the content of metal components was changed as described in Table 3. The liquid viscosity of the raw material liquid was 15 mPa·s as measured with a B-type viscometer at a liquid temperature of 25° C.

Comparative Examples 19-21

Gas barrier laminates having a (M)/(II) configuration were obtained in the same manner as in Example 1, except that filter filtration was not performed and the content of the metal component, thickness of the metal-containing layer (M), and thickness of the gas barrier layer (II) were changed as described in Table 3. The liquid viscosity of the raw material liquid was 15 mPa's as measured with a B-type viscometer at a liquid temperature of 25° C.

Comparative Example 25

Gas barrier laminate with (R)/(M)/(II) structure was obtained in the same manner as in Example 8, except that the configuration of the base layer, metal component content, and mass ratio of PVA and EMA were changed as described in Table 3, and that the addition of defoaming agent and filter filtration were not performed. The liquid viscosity of the raw material liquid was 15 mPa-s as measured with a B-type viscometer at a liquid temperature of 25° C.

[Table 1a] and [Table 1b]

TABLE 1a

| | | laminate structure | | | plastic base material (I) | | | |
| | | | | | | | metal-containing layer (M) | |
| | | config-uration | thickness | | | resin (R) | metal | | |
| | | | R μm | M μm | II μm | resin | compound | content mass % | resin |
|---|---|---|---|---|---|---|---|---|---|
| Ex. | 1 | M/II | — | 15.0 | 0.3 | — | MgO | 0.5 | PA6 |
| | 2 | M/II | — | 15.0 | 0.3 | — | MgO | 0.5 | PA6 |
| | 3 | M/II | — | 15.0 | 0.3 | — | MgO | 0.5 | PA6 |
| | 4 | M/II | — | 15.0 | 0.3 | — | MgO | 0.5 | PA6 |
| | 5 | M/II | — | 15.0 | 0.3 | — | MgO | 0.5 | PA6 |
| | 6 | M/II | — | 15.0 | 0.3 | — | MgO | 0.1 | PA6 |
| | 7 | M/II | — | 15.0 | 0.3 | — | MgO | 50.0 | PA6 |
| | 8 | R/M/II | 14.5 | 0.5 | 0.3 | PA6 | MgO | 50.0 | PA6 |
| | 9 | M/II | — | 15.0 | 0.3 | — | MgO | 0.5 | PET |
| | 10 | M/II | — | 15.0 | 0.3 | — | MgO | 0.5 | PA6 |
| | 11 | M/II | — | 15.0 | 0.3 | — | MgO | 0.5 | PA6 |
| | 12 | M/II | — | 15.0 | 0.3 | — | MgO | 0.5 | PA6 |
| | 13 | M/II | — | 15.0 | 0.3 | — | MgO | 0.5 | PA6 |

TABLE 1b

| | | gas barrier layer (II) | | | | | | | filtering process | | | |
|---|---|---|---|---|---|---|---|---|---|---|---|---|
| | | composition | | | | | | | | | | |
| | | | poly | | | neutral- | defoaming agent | | | filter- | | |
| | other resin — | carboxylic acid — | mass ratio — | base — | ization degree mol % | main component — | addition amount mass % | d50 μm | filtration accuracy μm | pump pressure MPa | stretching method — |
| Ex. 1 | PVA | EMA | 3/7 | NaOH | 10.0 | mineral oil 1 | 0.0200 | 1.61 | 1.0 | 0.10 | simultaneous |
| 2 | PVA | EMA | 3/7 | NaOH | 10.0 | mineral oil 1 | 0.0200 | 0.42 | 1.0 | 0.20 | simultaneous |
| 3 | PVA | EMA | 3/7 | NaOH | 10.0 | mineral oil 1 | 0.0200 | 0.10 | 1.0 | 0.30 | simultaneous |
| 4 | PVA | EMA | 3/7 | NaOH | 10.0 | mineral oil 1 | 0.0200 | 0.59 | 2.0 | 0.20 | simultaneous |
| 5 | PVA | EMA | 3/7 | NaOH | 10.0 | mineral oil 1 | 0.0200 | 0.82 | 4.0 | 0.25 | simultaneous |
| 6 | PVA | EMA | 3/7 | NaOH | 10.0 | mineral oil 1 | 0.0200 | 0.81 | 4.0 | 0.25 | simultaneous |
| 7 | PVA | EMA | 3/7 | NaOH | 10.0 | mineral oil 1 | 0.0200 | 0.84 | 4.0 | 0.25 | simultaneous |
| 8 | PVA | EMA | 5/5 | NaOH | 10.0 | mineral oil 1 | 0.0200 | 0.78 | 4.0 | 0.25 | simultaneous |
| 9 | PVA | EMA | 3/7 | NaOH | 10.0 | mineral oil 1 | 0.0200 | 0.81 | 4.0 | 0.25 | simultaneous |
| 10 | PVA | EMA | 3.7 | NaOH | 10.0 | mineral oil 1 | 0.0200 | 1.35 | 5.0 | 0.25 | simultaneous |
| 11 | PVA | EMA | 3/7 | NaOH | 10.0 | mineral oil 1 | 0.0200 | 3.75 | 10.0 | 0.25 | simultaneous |
| 12 | PVA | EMA | 3/7 | NaOH | 10.0 | mineral oil 1 | 0.0100 | 0.84 | 4.0 | 0.25 | simultaneous |
| 13 | PVA | EMA | 3/7 | NaOH | 10.0 | mineral oil 1 | 0.0500 | 0.79 | 4.0 | 0.25 | simultaneous |

"Ex.": Example,
"ComEx": Comparative Example,
"simultaneous": simultaneous biaxial stretching,
"sequential": sequential biaxial stretching

[Table 2a] and [Table 2b]

TABLE 2a

| | | | plastic base material (I) | | | | | |
|---|---|---|---|---|---|---|---|---|
| | laminate structure | | | | metal-containing layer (M) | | | |
| | | thickness | | | resin (R) | metal | | |
| | configuration — | R μm | M μm | II μm | resin — | compound — | content mass % | resin — |
| Ex. 14 | M/II | — | 15.0 | 0.3 | — | MgO | 0.5 | PA6 |
| 15 | M/II | — | 15.0 | 0.3 | — | MgO | 0.5 | PA6 |
| 16 | M/II | — | 15.0 | 0.3 | — | MgO—2 | 0.5 | PA6 |
| 17 | M/II | — | 15.0 | 0.3 | — | MgCO3 | 0.5 | PA6 |
| 18 | M/II | — | 15.0 | 0.3 | — | CaCO3 | 0.5 | PA6 |
| 19 | M/II | — | 15.0 | 0.3 | — | ZnO | 0.5 | PA6 |
| 20 | M/II | — | 15.0 | 0.3 | — | MgO | 0.5 | PA6 |
| 21 | M/II | — | 15.0 | 0.3 | — | MgO | 0.5 | PA6 |
| 22 | M/II | — | 15.0 | 0.3 | — | MgO | 0.5 | PA6 |
| 23 | M/II | — | 15.0 | 0.3 | — | MgO | 0.5 | PA6 |
| 24 | M/II | — | 15.0 | 0.3 | — | MgO | 0.5 | PA6 |
| 25 | M/II | — | 15.0 | 0.3 | — | MgO | 0.5 | PA6 |
| 26 | M/II | — | 15.0 | 0.3 | — | MgO | 0.5 | PA6 |
| 27 | M/II | — | 15.0 | 0.3 | — | MgO | 0.5 | PA6 |
| 28 | II/M/II | — | 15.0 | 0.5/0.3 | — | MgO | 0.5 | PA6 |
| 29 | PVDC/M/II | — | 15.0 | 0.3 | — | MgO | 0.5 | PA6 |
| 30 | M/II | — | 15.0 | 0.3 | — | MgO | 0.5 | PA6 |
| 31 | M/II | — | 15.0 | 0.3 | — | MgO | 0.5 | PA6 |
| 32 | M/II | — | 15.0 | 0.3 | — | MgO | 0.5 | P.A6 |
| 33 | M/II | — | 15.0 | 0.3 | — | MgO | 0.5 | PA6 |
| 34 | M/II | — | 15.0 | 0.3 | — | MgO | 0.5 | PA6 |
| 35 | M/II | — | 15.0 | 0.3 | — | MgO | 0.5 | PA6 |

"Ex.":Example,
"ComEx":Comparative Example,
"simultaneous": simultaneous biaxial stretching,
"sequential": sequential biaxial stretching TABLE 2b

| | | gas barrier layer (II) | | | | | | | | | |
|---|---|---|---|---|---|---|---|---|---|---|---|
| | | composition | | | | | | | filtering process | | |
| | | | poly- | | | | defoaming agent | | filter- | | |
| | | other resin | carboxylic acid | mass ratio | base | Neutralization degree mol % | main component | addition amount mass % | d50 μm | filtration accuracy μm | pump pressure MPa | stretching method |
| Ex. | 14 | PVA | EMA | 3/7 | NaOH | 10.0 | mineral oil 1 | 0.0010 | 0.77 | 4.0 | 0.25 | simultaneous |
| | 15 | PVA | EMA | 3/7 | NaOH | 10.0 | mineral oil 1 | 0.1000 | 0.77 | 4.0 | 0.25 | simultaneous |
| | 16 | PVA | EMA | 3/7 | NaOH | 10.0 | mineral oil 1 | 0.0200 | 0.79 | 4.0 | 0.25 | simultaneous |
| | 17 | PVA | EMA | 3/7 | NaOH | 10.0 | mineral oil 1 | 0.0200 | 0.82 | 4.0 | 0.25 | simultaneous |
| | 18 | PVA | EMA | 3/7 | NaOH | 10.0 | mineral oil 1 | 0.0200 | 0.80 | 4.0 | 0.25 | simultaneous |
| | 19 | PVA | EMA | 3/7 | NaOH | 10.0 | mineral oil 1 | 0.0200 | 0.88 | 4.0 | 0.25 | simultaneous |
| | 20 | PVA | EMA | 3/7 | NaOH | 10.0 | mineral oil 2 | 0.0200 | 0.81 | 4.0 | 0.25 | simultaneous |
| | 21 | PVA | EMA | 3/7 | NaOH | 10.0 | polyether | 0.0200 | 0.84 | 4.0 | 0.25 | simultaneous |
| | 22 | PVA | EMA | 3/7 | NaOH | 10.0 | Acetylene glycol | 0.0200 | 0.83 | 4.0 | 0.25 | simultaneous |
| | 23 | PVA | EMA | 3/7 | NaOH | 10.0 | aqueous emulsion | 0.0200 | 0.84 | 4.0 | 0.25 | simultaneous |
| | 24 | PVA | EMA | 3/7 | NaOH | 10.0 | silicone 1 | 0.0200 | 0.82 | 4.0 | 0.25 | simultaneous |
| | 25 | PVA | EMA | 3/7 | NaOH | 10.0 | silicone 2 | 0.0200 | 0.79 | 4.0 | 0.25 | simultaneous |
| | 26 | PVA | EMA | 3/7 | NaOH | 10.0 | Vegetable oil | 0.0200 | 0.79 | 4.0 | 0.25 | simultaneous |
| | 27 | PVA | EMA | 3/7 | NaOH | 10.0 | mineral oil 1 | 0.0200 | 0.80 | 4.0 | 0.25 | sequential |
| | 28 | PVA | EMA | 3/7 | NaOH | 10.0 | mineral oil 1 | 0.0200 | 0.78 | 4.0 | 0.25 | simultaneous |
| | 29 | PVA | EMA | 3/7 | NaOH | 10.0 | mineral oil 1 | 0.0200 | 0.78 | 4.0 | 0.25 | simultaneous |
| | 30 | PVA | EMA | 3/7 | NaOH | 10.0 | | — | — | 4.0 | 0.25 | simultaneous |
| | 31 | EVOH | EMA | 3/7 | NaOH | 10.0 | mineral oil | 0.0200 | 0.83 | 4.0 | 0.25 | simultaneous |
| | 32 | starch | EMA | 3/7 | NaOH | 10.0 | mineral oil | 0.0200 | 0.79 | 4.0 | 0.25 | simultaneous |
| | 33 | PVA | PAA | 3/7 | NaOH | 10.0 | mineral oil | 0.0200 | 0.79 | 4.0 | 0.25 | simultaneous |
| | 34 | PVA | P(AA-A) | 3/7 | NaOH | 10.0 | mineral oil | 0.0200 | 0.82 | 4.0 | 0.25 | simultaneous |
| | 35 | PAM | PAA | 3/7 | NaOH | 10.0 | mineral oil | 0.0200 | 0.80 | 4.0 | 0.25 | simultaneous |

"Ex.":Example,
"ComEx":Comparative Example,
"simultaneous": simultaneous biaxial stretching,
"sequential": sequential biaxial stretching

[Table 3a] and [Table 3b]

TABLE 3a

| | | | | | plastic base material (I) | | | |
|---|---|---|---|---|---|---|---|---|
| | | laminate structure | | | | | | |
| | | | thickness | | | resin (R) | metal | |
| | | configuration | R μm | M μm | II μm | resin | compound | content mass % | resin |
| Com. Ex. | 1 | M/II | — | 15.0 | 0.3 | — | MgO | 0.5 | PA6 |
| | 2 | M/II | — | 15.0 | 0.3 | — | MgO | 0.5 | PA6 |
| | 3 | M/II | — | 15.0 | 0.3 | — | Mg0 | 0.5 | PA6 |
| | 4 | M/II | — | 15.0 | 0.3 | — | MgO | 0.5 | PA6 |
| | 5 | M/II | — | 15.0 | 0.3 | — | MeO | 0.5 | PA6 |
| | 6 | M/II | — | 15.0 | 0.3 | — | MgO | 0.5 | PA6 |
| | 7 | M/II | — | 15.0 | 0.3 | — | MgO | 0.5 | PA6 |
| | 8 | M/II | — | 15.0 | 0.3 | — | MgO | 0.5 | PA6 |
| | 9 | M/II | — | 15.0 | 0.3 | — | MgO | 75 | PA6 |
| | 10 | II/M/II | — | 15.0 | 0.5/0.3 | — | MgO | 0.5 | PA6 |
| | 11 | PVDC/M/II | — | 15.0 | 0.3 | — | MgO | 0.5 | PA6 |
| | 12 | M/II | — | 15.0 | 0.3 | — | MgO | 20.0 | PA6 |
| | 13 | M/II | — | 15.0 | 0.3 | — | MgO | 50.0 | PA6 |
| | 14 | M/II | — | 15.0 | 0.3 | — | MgO | 70.0 | PA6 |
| | 15 | M/II | — | 15.0 | 5.0 | — | MgO | 70.0 | PA6 |
| | 16 | M/II | — | 100.0 | 5.0 | — | MgO | 70.0 | PA6 |
| | 17 | M/II | — | 15.0 | 0.3 | — | MgO | 20.0 | PA6 |
| | 18 | M/II | — | 15.0 | 0.3 | — | MgO | 50.0 | PA6 |
| | 19 | M/II | — | 15.0 | 0.3 | — | MgO | 70.0 | PA6 |
| | 20 | M/II | — | 15.0 | 5.0 | — | MgO | 70.0 | PA6 |
| | 21 | M/II | — | 100.0 | 5.0 | — | MgO | 70.0 | PA6 |
| | 22 | M/II | — | 15.0 | 0.3 | — | MgO | 1.0 | PA6 |

TABLE 3a-continued

| | laminate structure | | | | plastic base material (I) | | | |
|---|---|---|---|---|---|---|---|---|
| | | thickness | | | resin (R) | metal | | |
| | configuration | R μm | M μm | II μm | resin | compound | content mass % | resin |
| 23 | M/II | — | 15.0 | 0.3 | — | MgO | 15.0 | PA6 |
| 24 | M/II | — | 15.0 | 0.3 | — | MgO | 30.0 | PA6 |
| 25 | R/M/II | 10.0 | 5.0 | 0.5 | PA6 | MgO | 45.0 | PA6 |

"Ex.":Example,
"ComEx":Comparative Example,
"simultaneous": simultaneous biaxial stretching,
"sequential": sequential biaxial stretching TABLE 3b

| | | gas barrier layer (II) | | | | | | | | | |
|---|---|---|---|---|---|---|---|---|---|---|---|
| | | composition | | | | | defoaming agent | | | filtering process | |
| | | poly | | | neutral- | | | | | filter- | |
| | | other resin | carboxylic acid | mass ratio | base | ization degree mol % | main component | addition amount mass % | d50 μm | filtration accuracy μm | pump pressure MPa | stretching method |
| Comp. Ex. | 1 | PVA | EMA | 3/7 | NaOH | 10.0 | — | — | — | — | — | simultaneous |
| | 2 | PVA | EMA | 3/7 | NaOH | 10.0 | mineral oil 1 | 0.0200 | 20 | — | — | simultaneous |
| | 3 | PVA | EMA | 3/7 | NaOH | 10.0 | mineral oil 1 | 0.0200 | 0.04 | 0.5 | 0.30 | simultaneous |
| | 4 | PVA | EMA | 3/7 | NaOH | 10.0 | mineral oil 1 | 0.1000 | 0.04 | 0.5 | 0.30 | simultaneous |
| | 5 | PVA | EMA | 3/7 | NaOH | 10.0 | mineral oil 1 | 0.0200 | 5.28 | 15.0 | 0.25 | simultaneous |
| | 6 | PVA | EMA | 3/7 | NaOH | 10.0 | mineral oil 1 | 0.0010 | 5.33 | 15.0 | 0.25 | simultaneous |
| | 7 | PVA | EMA | 3/7 | NaOH | 10.0 | mineral oil 1 | 0.1000 | 5.20 | 15.0 | 0.25 | simultaneous |
| | 8 | PVA | — | 1/0 | — | — | mineral oil 1 | 0.0200 | 0.45 | 2.0 | 0.25 | simultaneous |
| | 9 | PVA | EMA | 3/7 | NaOH | 10.0 | mineral oil 1 | 0.0200 | 0.55 | 2.0 | 0.25 | simultaneous |
| | 10 | PVA | EMA | 3/7 | NaOH | 10.0 | mineral oil 1 | 0.0200 | 15 | — | — | simultaneous |
| | 11 | PV.A | EMA | 3/7 | NaOH | 10.0 | mineral oil 1 | 0.0200 | 15 | — | — | simultaneous |
| | 12 | PVA | EMA | 3/7 | NaOH | 10.0 | — | — | — | — | — | simultaneous |
| | 13 | PVA | EMA | 3/7 | NaOH | 10.0 | — | — | — | — | — | simultaneous |
| | 14 | PVA | EMA | 3/7 | NaOH | 10.0 | — | — | — | — | — | simultaneous |
| | 15 | PVA | EMA | 3/7 | NaOH | 10.0 | — | — | — | — | — | simultaneous |
| | 16 | PVA | EMA | 3/7 | NaOH | 10.0 | — | — | — | — | — | simultaneous |
| | 17 | PVA | EMA | 3/7 | NaOH | 10.0 | mineral oil 1 | 0.0200 | 20 | — | — | simultaneous |
| | 18 | PVA | EMA | 3/7 | NaOH | 10.0 | mineral oil 1 | 0.0200 | 20 | — | — | simultaneous |
| | 19 | PVA | EMA | 3/7 | NaOH | 10.0 | mineral oil 1 | 0.0200 | 20 | — | — | simultaneous |
| | 20 | PVA | EMA | 3/7 | NaOH | 10.0 | mineral oil 1 | 0.0200 | 20 | — | — | simultaneous |
| | 21 | PVA | EMA | 3/7 | NaOH | 10.0 | mineral oil 1 | 0.0200 | 20 | — | — | simultaneous |
| | 22 | PVA | EMA | 3/7 | NaOH | 10.0 | — | — | — | — | — | simultaneous |
| | 23 | PVA | EMA | 3/7 | NaOH | 10.0 | — | — | — | — | — | simultaneous |
| | 24 | PVA | EMA | 3/7 | NaOH | 10.0 | — | — | — | — | — | simultaneous |
| | 25 | PVA | EMA | 3/7 | NaOH | 10.0 | — | — | — | — | — | simultaneous |

Test Example 1

The gas barrier laminates obtained in each of the examples and comparative examples were evaluated for the following characteristics. The results are shown in Tables 4 through 6.
(1) Average Particle Diameter of Metal or Metal Compound
The value of the cumulative distribution 50% in the particle diameter distribution (volume distribution) curve measured with a laser particle diameter analyzer "Microtrac HRA" (Nikkiso Co., Ltd.) was calculated. The sample for the average particle diameter measurement was prepared by adding 50 g of isopropyl alcohol (IPA) to 0.5 g of metal or metal compound and performing ultrasonic dispersion treatment for 3 minutes.
(2) Particle Diameter of Defoaming Agent
The coating liquid for forming the gas barrier layer (II) just before applying to the water immersion treated non-stretched film was used as the sample for measurement. The particle diameter of the defoaming agent was measured using a laser diffraction particle diameter distribution analyzer (SALD-2300) manufactured by Shimadzu Corporation. The obtained median diameter (D50) value was used as the average particle diameter.

(3) Thickness of Each Layer

The obtained gas barrier laminate was left in an environment of temperature of 23° C. and humidity of 50% RH for at least 2 hours, and then the film cross-section was observed by scanning electron microscopy (SEM) to measure the thickness of each layer.

(4) Oxygen Transmission Rate

The obtained gas barrier laminate was left in an environment of temperature of 23° C. and humidity of 50% RH for at least 2 hours before hydrothermal treatment, and then the oxygen transmission rate was measured at a temperature of 40° C. and humidity of 90% RH using an oxygen transmission rate measuring device (OX-TRAN 2/22L) manufactured by Mocon.

In addition to the above, the obtained gas barrier laminate was subjected to hot water treatment at a temperature of 95° C. for 30 minutes, and then left in an environment of temperature of 23° C. and humidity of 50% RH for at least 2 hours, and then the oxygen transmission rate was measured using an oxygen transmission rate measuring device (OX-TRAN 2/22L) manufactured by Mocon at environments of (a) temperature of 20° C. and humidity of 65% RH, (b) temperature of 20° C. and humidity of 90% RH, (c) temperature of 30° C. and humidity of 80% RH, and (d) temperature of 40° C. and humidity of 90% RH, respectively. The unit of oxygen transmission rate is ml/($m^2$·day·MPa) The test under (c) above is for reference only, so the results of only some of the examples and comparative examples are shown.

(5) Liquid Viscosity

The raw material liquid of the coating liquid for forming the gas barrier layer (II) immediately before filter filtration was used as the sample for measurement, and the liquid viscosity at a liquid temperature of 25° C. was measured using Viscometer DV2T (digital rotational viscometer (B-type viscometer) manufactured by BROOKFIELD). A model circulating thermostatic bath equipped with MPC controller manufactured by HUBER was used to control the liquid temperature.

Table 4

TABLE 4

| | oxygen transmissionrateml rate ml/($m^2$ · day · MPa) | | | | |
|---|---|---|---|---|---|
| | before hot water reatment | after hot water treatment | | | |
| | 40° C. × 90% RH | 20° C. × 65% RH | 20° C. × 90% RH | 30° C. × 80% RH | 40° C. × 90% RH |
| Ex. 1 | 2210 | 3 | 10 | 15 | 115 |
| Ex. 2 | 1560 | 2 | 5 | — | 60 |
| Ex. 3 | 2930 | 6 | 31 | — | 235 |
| Ex. 4 | 1490 | 2 | 4 | 7 | 49 |
| Ex. 5 | 1520 | 2 | 5 | — | 57 |
| Ex. 6 | 2100 | 55 | 111 | — | 163 |
| Ex. 7 | 1370 | 2 | 3 | — | 37 |
| Ex. 8 | 1950 | 27 | 55 | — | 105 |
| Ex. 9 | 2310 | 2 | 6 | — | 63 |
| Ex. 10 | 2410 | 5 | 13 | — | 110 |
| Ex. 11 | 2650 | 6 | 29 | — | 236 |
| Ex. 12 | 1830 | 3 | 7 | — | 79 |
| Ex. 13 | 1920 | 3 | 8 | — | 92 |

"Ex.":Example,
"ComEx":Comparative Example

Table 5

TABLE 5

| | oxygen transmission rate ml/($m^2$ · day · MPa) | | | | |
|---|---|---|---|---|---|
| | before hot water treatment | after hot water treatment | | | |
| | 40° C. × 90% RH | 20° C. × 65% RH | 20° C. × 90% RH | 30° C. × 30% RH | 40° C. × 90% RH |
| Ex. 14 | 2370 | 5 | 17 | — | 153 |
| Ex. 15 | 2400 | 9 | 29 | — | 184 |
| Ex. 16 | 1890 | 12 | 24 | — | 88 |
| Ex. 17 | 2200 | 49 | 123 | — | 170 |
| Ex. 18 | 1980 | 13 | 29 | — | 85 |
| Ex. 19 | 2100 | 39 | 108 | — | 160 |
| Ex. 20 | 1550 | 2 | 4 | — | 55 |
| Ex. 21 | 1610 | 1 | 6 | — | 67 |
| Ex. 22 | 1590 | 4 | 6 | — | 71 |
| Ex. 23 | 1510 | 2 | 5 | — | 59 |
| Ex. 24 | 1500 | 2 | 5 | — | 60 |
| Ex. 25 | 1550 | 3 | 6 | — | 68 |
| Ex. 26 | 1570 | 2 | 3 | — | 49 |
| Ex. 27 | 1550 | 3 | 6 | — | 56 |
| Ex. 28 | 1190 | 1 | 2 | — | 30 |

TABLE 5-continued

| | oxygen transmission rate ml/(m² · day · MPa) | | | | |
|---|---|---|---|---|---|
| | before hot water treatment | after hot water treatment | | | |
| | 40° C. × 90% RH | 20° C. × 65% RH | 20° C. × 90% RH | 30° C. × 30% RH | 40° C. × 90% RH |
| Ex. 29 | 550 | 1 | 2 | — | 42 |
| Ex. 30 | 2300 | 10 | 170 | — | 290 |
| Ex 31 | 1600 | 10 | 65 | — | 98 |
| Ex. 32 | 2200 | 24 | 68 | — | 140 |
| Ex. 33 | 2150 | 10 | 70 | — | 95 |
| Ex. 34 | 2800 | 14 | 72 | — | 79 |
| Ex. 35 | 2480 | 30 | 75 | — | 245 |

Table 6

TABLE 6

| | oxygen transmission rate ml/(m² · day · MPa) | | | | |
|---|---|---|---|---|---|
| | before hot water treatment | after hot water treatment | | | |
| | 40° C. × 90% RH | 20° C. × 65% RH | 20° C. × 90% RH | 30° C. × 80%RH | 40° C. × 90% RH |
| Com. Ex 1 | 3960 | 11 | 161 | — | 660 |
| Com. Ex 2 | 3600 | 10 | 107 | — | 400 |
| Com. Ex 3 | 3310 | 9 | 105 | — | 391 |
| Com. Ex 4 | 2960 | 9 | 90 | — | 399 |
| Com. Ex 5 | 3400 | 8 | 83 | — | 380 |
| Com. Ex 6 | 3290 | 10 | 109 | — | 410 |
| Com. Ex 7 | 3840 | 9 | 180 | — | 520 |
| Com. Ex 8 | 4500 | 450 | 890 | — | 4000 |
| Com. Ex 9 | | | cannot be stretched | | |
| Com. Ex 10 | 2100 | 8 | 85 | — | 385 |
| Com. Ex 11 | 750 | 9 | 94 | — | 395 |
| Com. Ex 12 | 3760 | 0.2 | 20 | — | 594 |
| Com. Ex 13 | 3570 | 0.1 | 18 | — | 561 |
| Com. Ex 14 | 3440 | 0.1 | 18 | — | 550 |
| Com. Ex 15 | 3430 | 0.1 | 17 | — | 555 |
| Com. Ex 16 | 3430 | 0.1 | 15 | 30 | 549 |
| Com. Ex 17 | 3420 | 10 | 86 | — | 360 |
| Com. Ex 18 | 3250 | 10 | 64 | — | 340 |
| Com. Ex 19 | 3100 | 9 | 63 | — | 339 |
| Com. Ex 20 | 3100 | 9 | 59 | — | 327 |
| Com. Ex 21 | 3090 | 9 | 58 | — | 328 |
| Com. Ex 22 | 3900 | 5 | 51 | — | 620 |
| Com. Ex 23 | 3800 | 0.2 | 25 | — | 605 |
| Com. Ex 24 | 3600 | 0.1 | 18 | — | 580 |
| Com. Ex 25 | 3580 | 0.1 | 18 | 35 | 555 |

"Ex.":Example,
"ComEx":Comparative Example.

It can be seen that the gas barrier laminates of Examples 1-35 all have excellent gas barrier ability under high temperature and high humidity environments by hot water treatment.

On the other hand, the gas barrier laminates in Comparative Examples 1, 2, and 10-21 did not exhibit gas barrier properties under high temperature and high humidity environments because the gas barrier layer was formed using a coating liquid for forming a gas barrier layer without conducting a filter filtration process. In particular, in Comparative Examples 16 and 21, the total thickness of the laminate exceeded 100 μm, but the oxygen transmission rate was 549 and 328 ml/(m²·day·MPa) at a temperature of 40° C. and humidity of 90% RH, respectively. In other words, it can be seen that the desired gas barrier property cannot be obtained in the laminate in which the gas barrier layer is formed using the coating liquid for forming the gas barrier layer prepared without going through the filter filtration process, even if the total thickness exceeds 100 μm.

In addition, the gas barrier laminates described in Comparative Examples 3 to 7 did not exhibit the desired gas barrier properties under high temperature and high humidity environments because the filtration accuracy of the filter used in the filtration process of the coating liquid for forming the gas barrier layer was outside the range of 1.0 to 10.0 μm.

In Comparative Example 8, since the gas barrier layer (II) did not contain a polycarboxylic acid component, the gas barrier properties did not develop regardless of temperature and humidity conditions.

Comparative Example 9 was not stretchable because the metal compound content in the plastic base material (I) was outside the range specified in the present invention.

Comparative Examples 22-25 are laminates corresponding to Patent Document 2. Although these have good gas barrier properties at 20° C.×65% RH, the oxygen transmission rate at 40° C.×95% RH, which is a high temperature and high humidity environment, exceeds 500 ml/(m²·day·MPa), indicating that the desired gas barrier property cannot be obtained.

According to the test results (Example 1, Example 4, Comparative Example 15, and Comparative Example 25) under the conditions described in (c) above, which were conducted for reference, the oxygen transmission rate increased in all cases in comparison with the test results at 40° C.×95% RH. In this case, in Comparative Examples 15 and 25, the degree of increase from 30° C.×80% RH to 40° C.×95% RH is 100 times or greater than the degree of increase from 20° C.×65% RH to 30° C.×80% RH, it is found that 40° C.×95% RH is a rather harsh condition. In contrast, the degree of increase from 30° C.×80% RH to 40° C.×95% RH in Examples 1 and 4 is less than even 10 times. From this point of view, it can be understood that the laminates of Examples 1 and 4 demonstrate extremely high gas barrier properties.

The invention claimed is:

1. A gas barrier laminate including a plastic base material (I) and a gas barrier layer (II) laminated on the plastic base material, and having a total thickness of 100 m or less, wherein
   (1) the plastic base material (I) includes a metal-containing layer containing a resin component and at least one selected from the group consisting of metal and a metal compound,
   (2) the total content of metal and metal compound in the metal-containing layer is 0.2 to 5 mass %,
   (3) the gas barrier layer (II) contains a polycarboxylic acid,
   (4) the metal-containing layer and gas barrier layer are laminated so that the layers are in direct contact with each other, and
   (5) the gas barrier laminate has an oxygen transmission rate of 100 ml/(m²·day·MPa) or less under an environment of temperature of 40° C. and humidity of 90% RH after hot water treatment at 95° C. for 30 minutes.

2. The gas barrier laminate according to the claim 1, wherein the plastic base material (I) comprises a multi-layer film.

3. The gas barrier laminate according to the claim 1, wherein the metal-containing layer contains polyamide resin or polyester resin as a resin component.

4. The gas barrier laminate according to the claim 1, wherein the gas barrier layer (II) contains polyalcohol.

5. The gas barrier laminate according to the claim 1, wherein at least one selected from the group consisting of magnesium, calcium, and zinc is contained as the metal or metal compound.

6. The gas barrier laminate according to the claim 1, wherein the total thickness of the laminate is 30 μm or less.

7. The gas barrier laminate according to the claim 1, the gas barrier laminate has an oxygen transmission rate of 60 ml/(m²·day·MPa) or less under an environment of temperature of 40° C. and humidity of 90% RH after hot water treatment at 95° C. for 30 minutes.

8. A packaging bag including the gas barrier laminate according to claim 1.

9. A packaging bag including the gas barrier laminate according to claim 2.

10. A packaging bag including the gas barrier laminate according to claim 3.

11. A packaging bag including the gas barrier laminate according to claim 4.

12. A packaging bag including the gas barrier laminate according to claim 5.

* * * * *